Nov. 25, 1958 T. C. MANN 2,861,328
MACHINE FOR ASSEMBLING UNIVERSAL JOINTS
Filed July 2, 1954 19 Sheets-Sheet 1
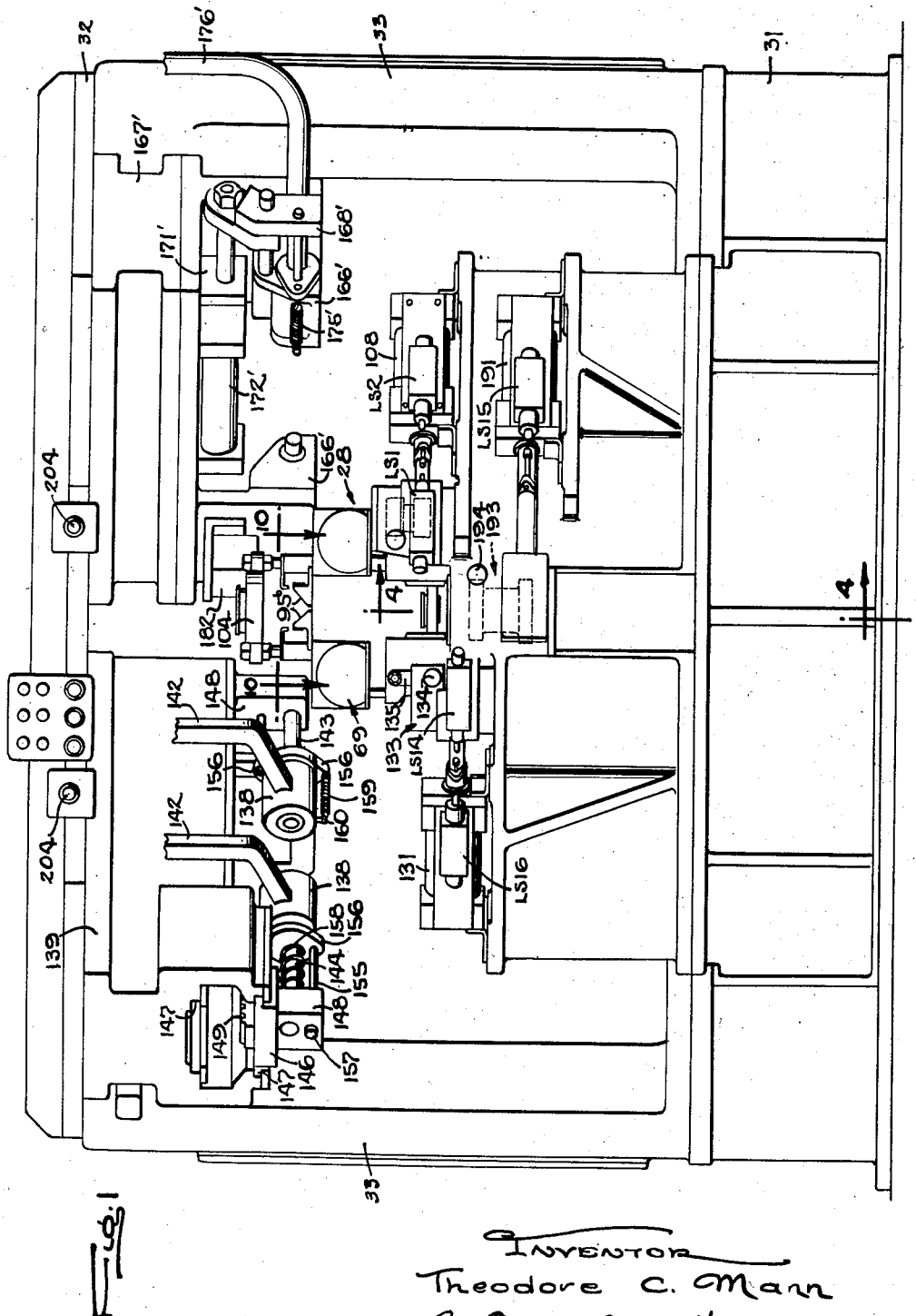
INVENTOR
Theodore C. Mann
By Coelom, Pitzner, Hubbard & Wolfe
ATTORNEY

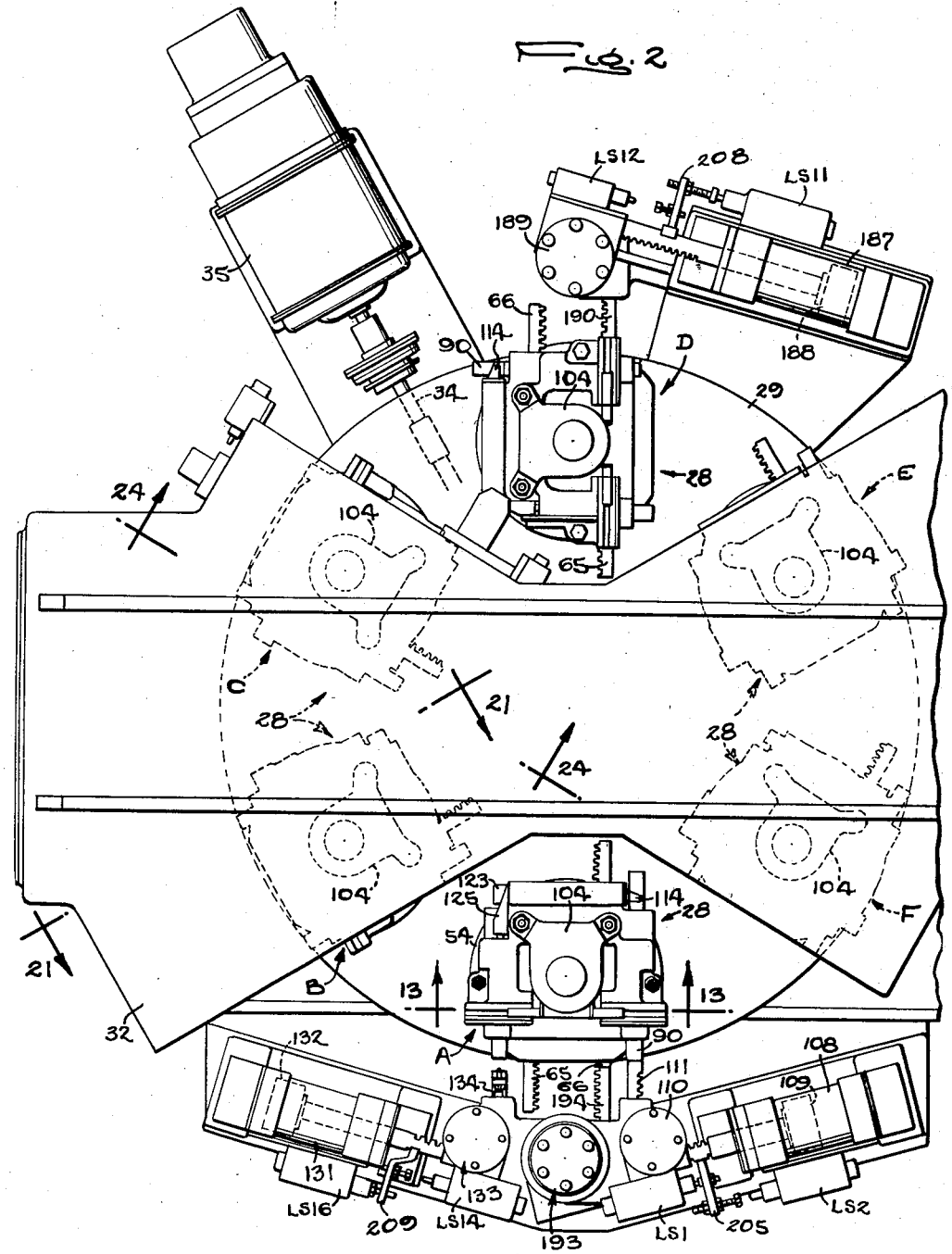

Nov. 25, 1958 T. C. MANN 2,861,328
MACHINE FOR ASSEMBLING UNIVERSAL JOINTS
Filed July 2, 1954 19 Sheets-Sheet 3
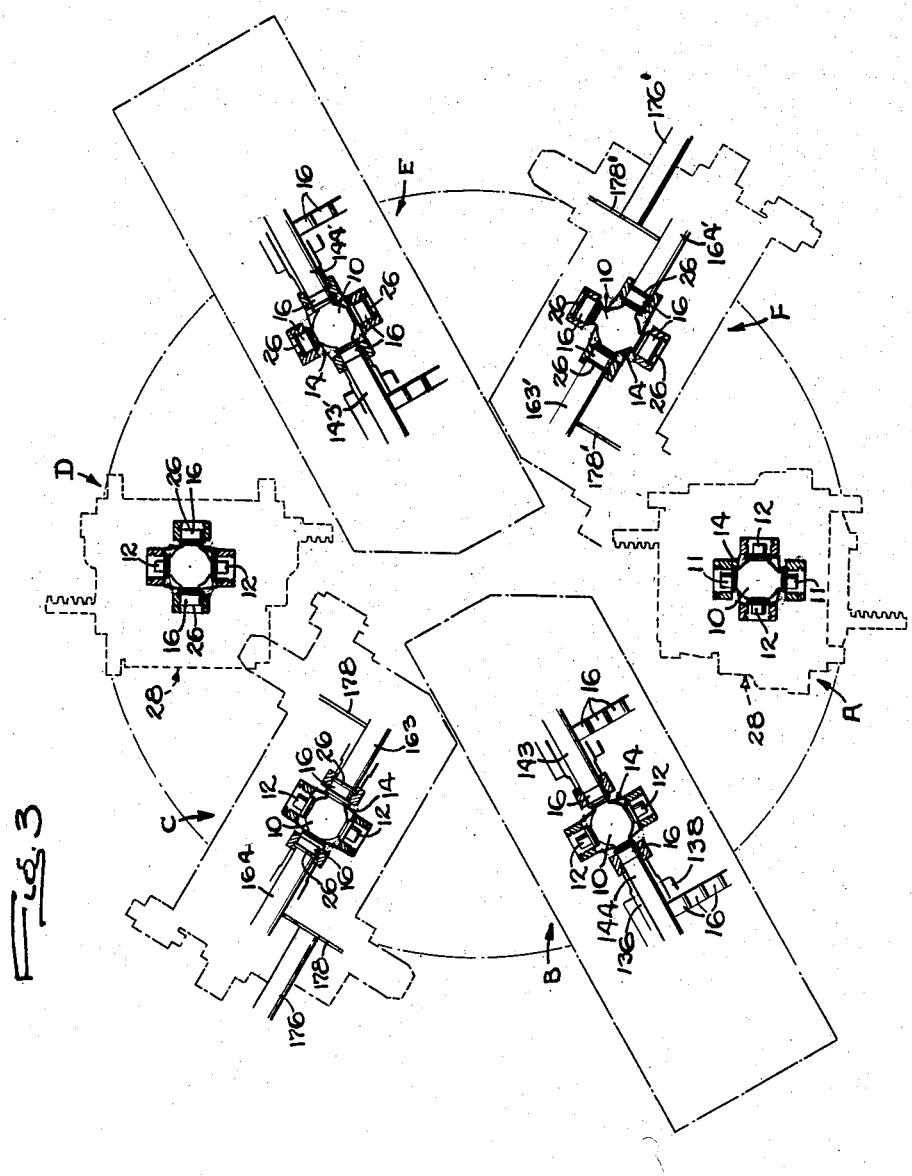

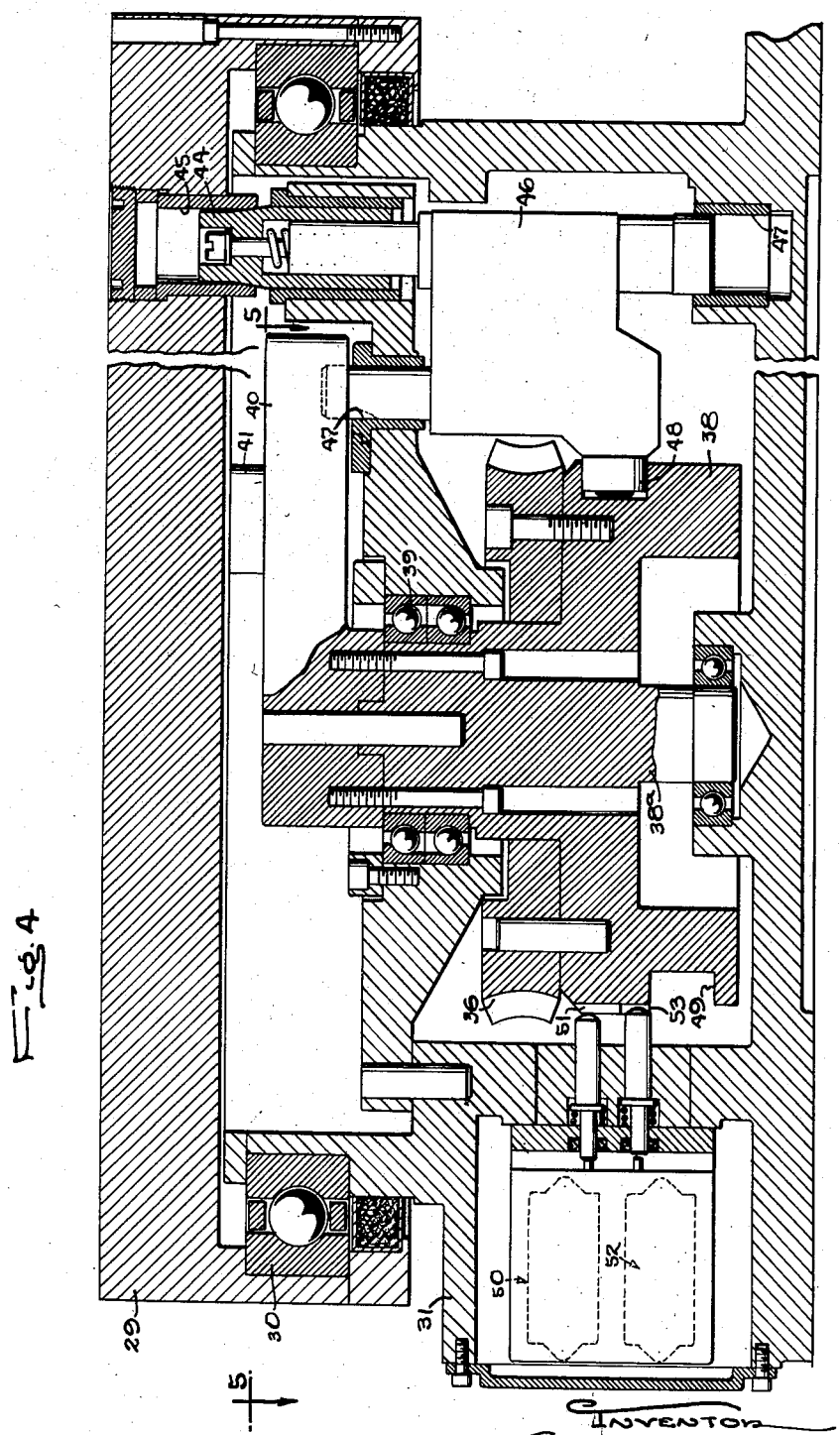

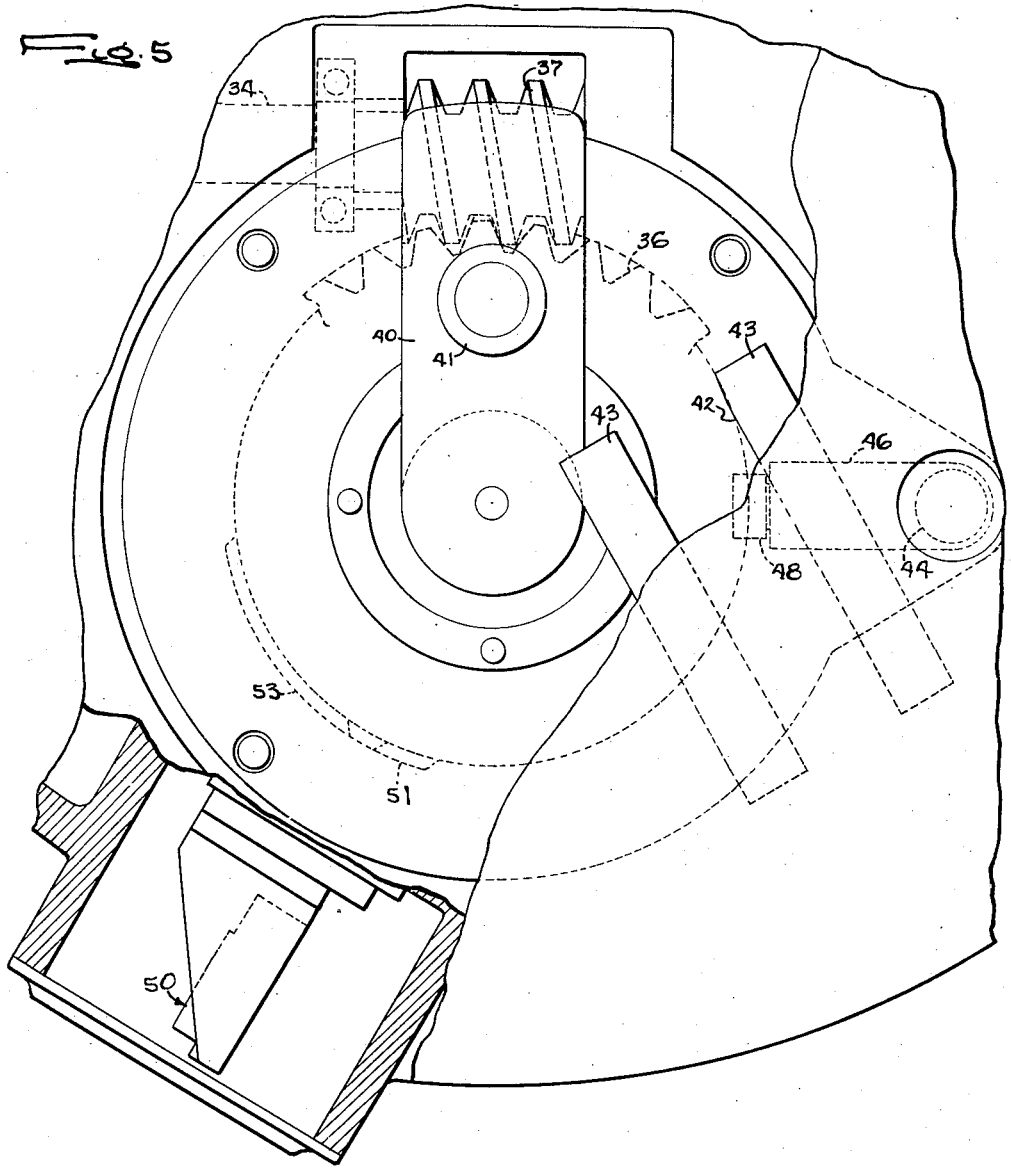

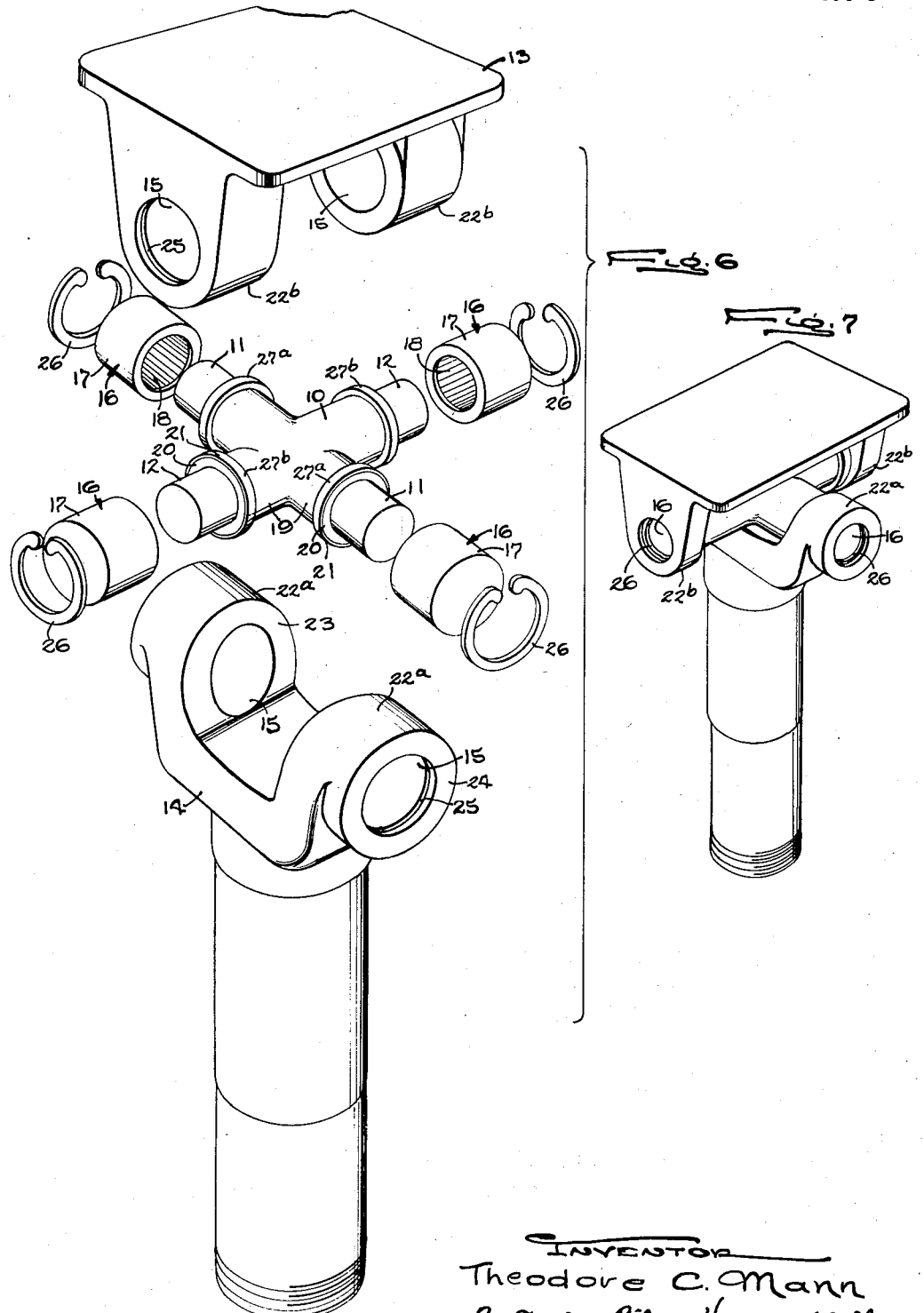

Nov. 25, 1958 T. C. MANN 2,861,328
MACHINE FOR ASSEMBLING UNIVERSAL JOINTS
Filed July 2, 1954 19 Sheets-Sheet 7
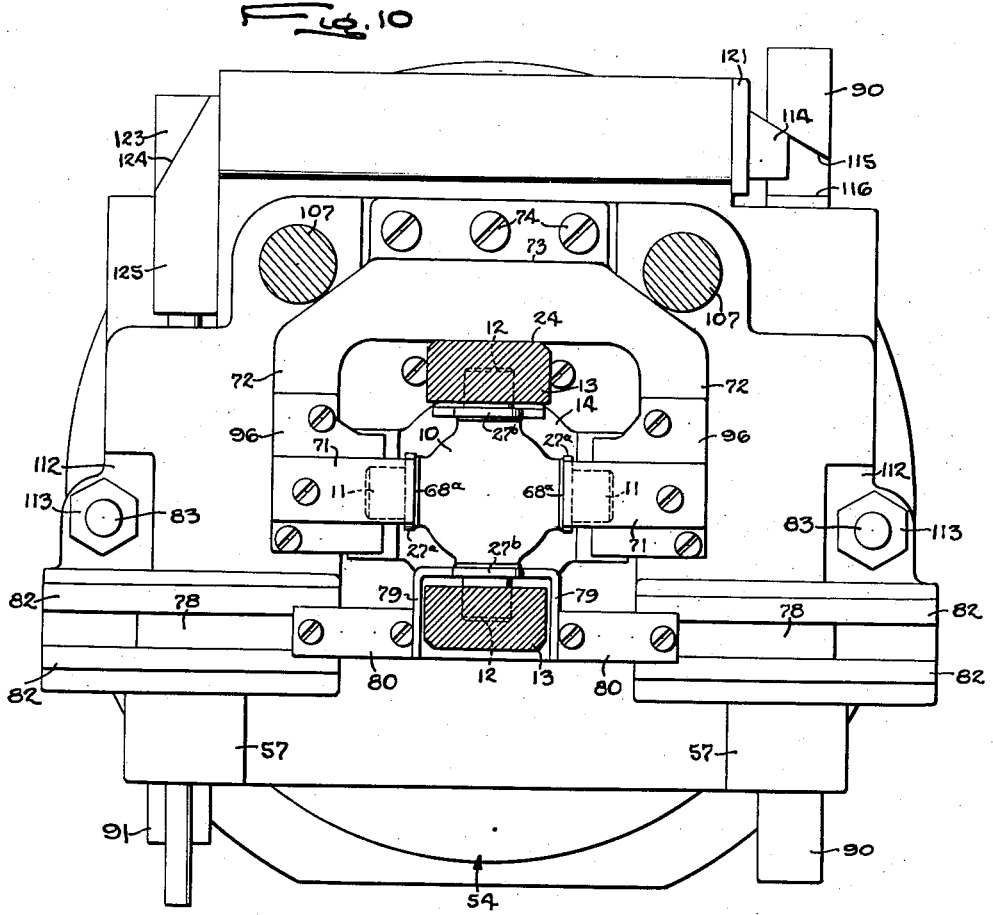
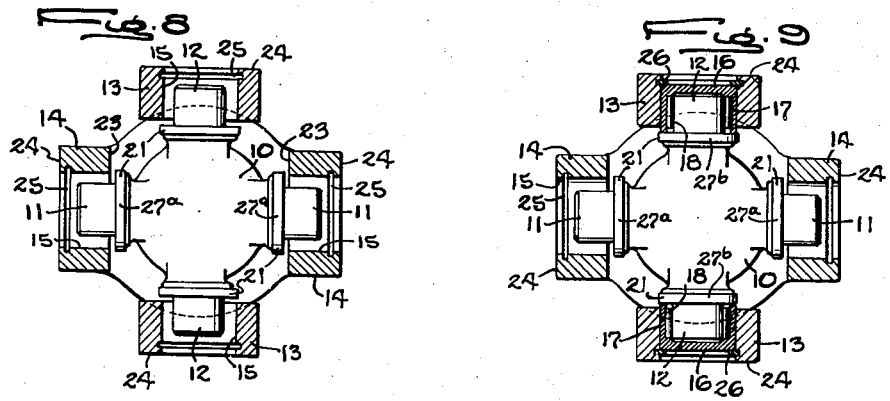

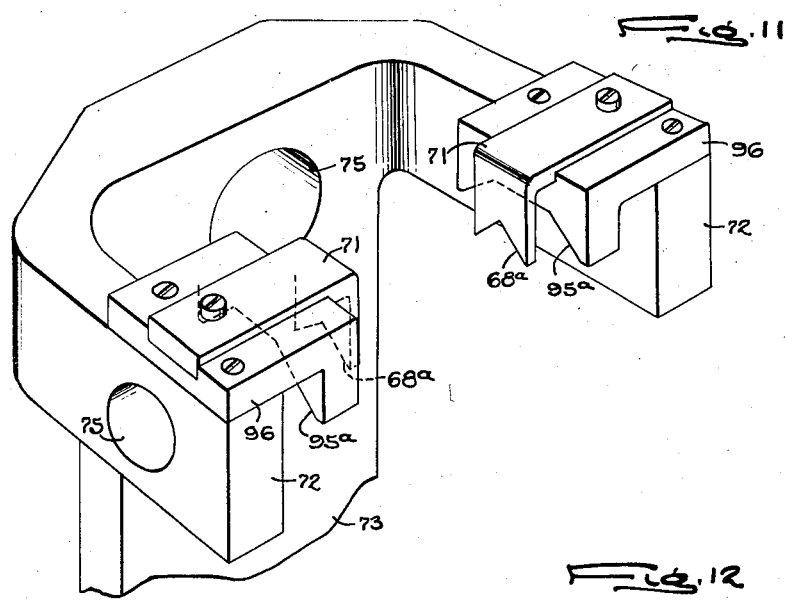
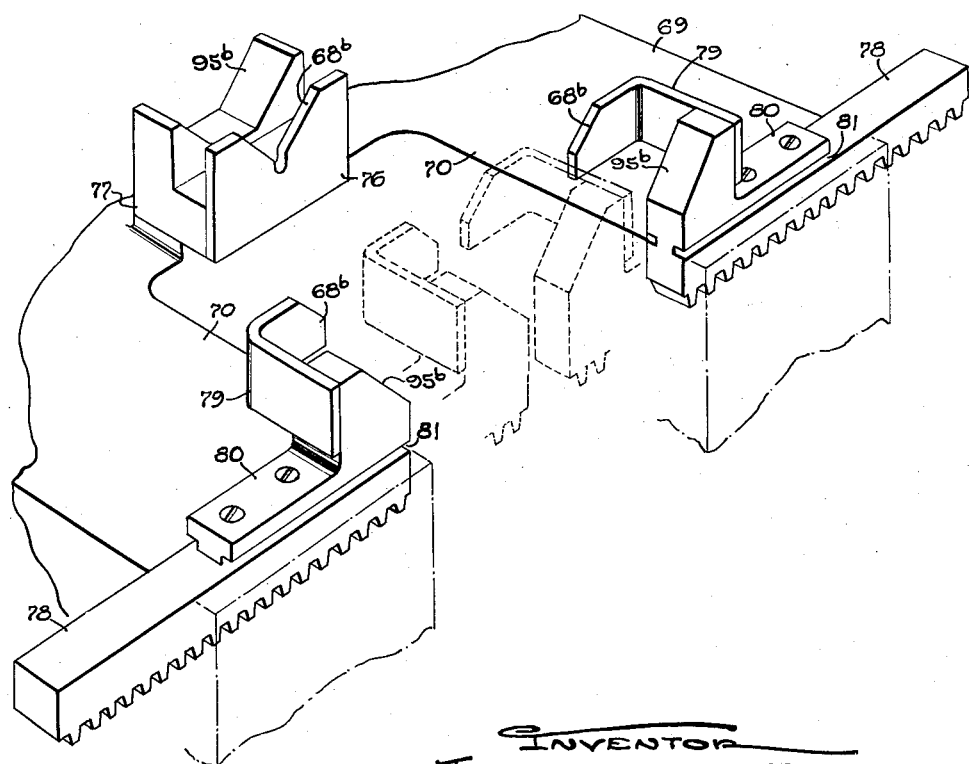

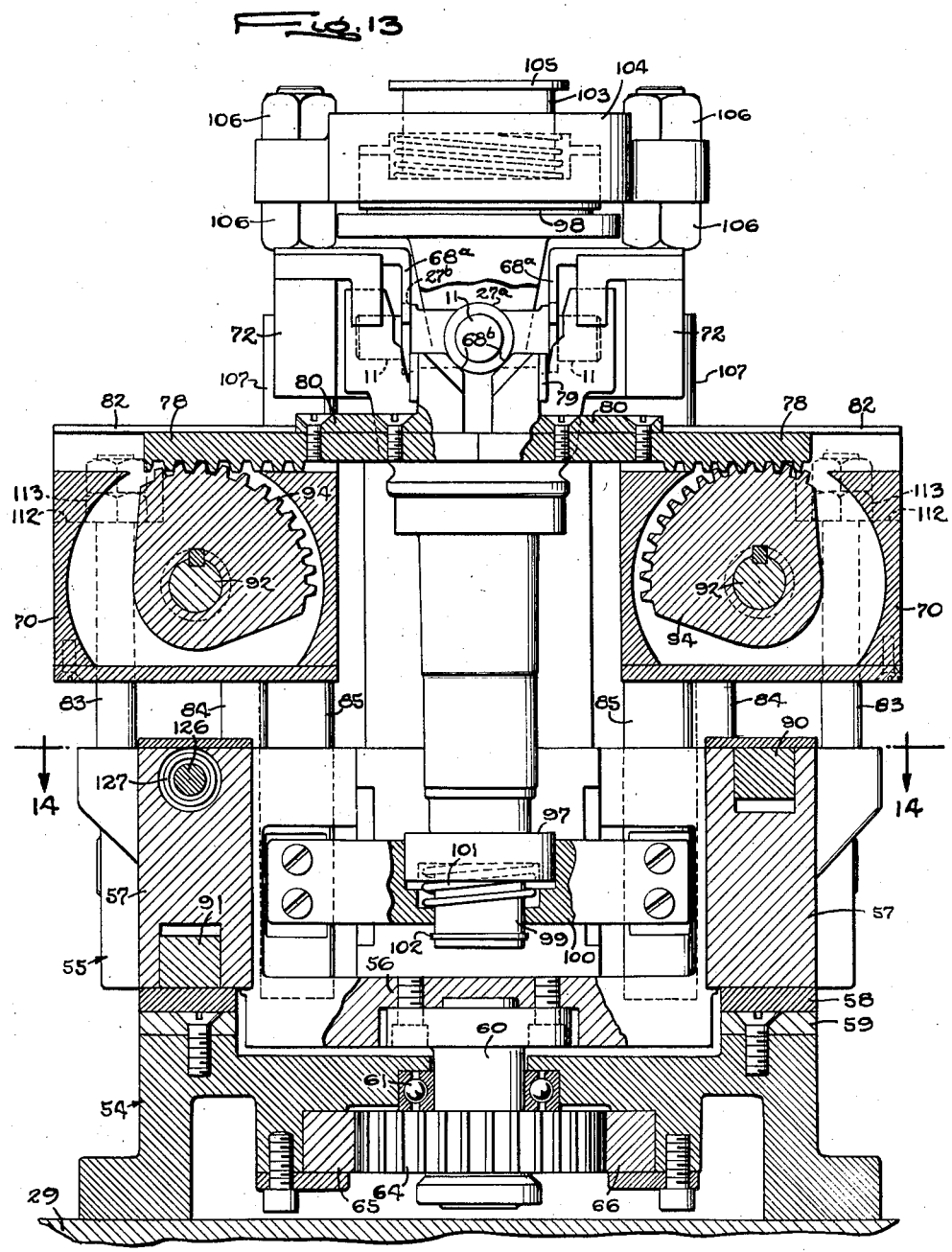

Nov. 25, 1958 T. C. MANN 2,861,328
MACHINE FOR ASSEMBLING UNIVERSAL JOINTS
Filed July 2, 1954 19 Sheets-Sheet 10
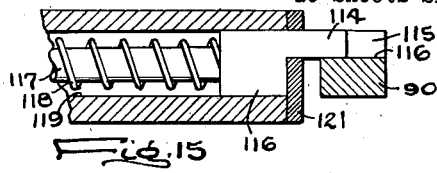
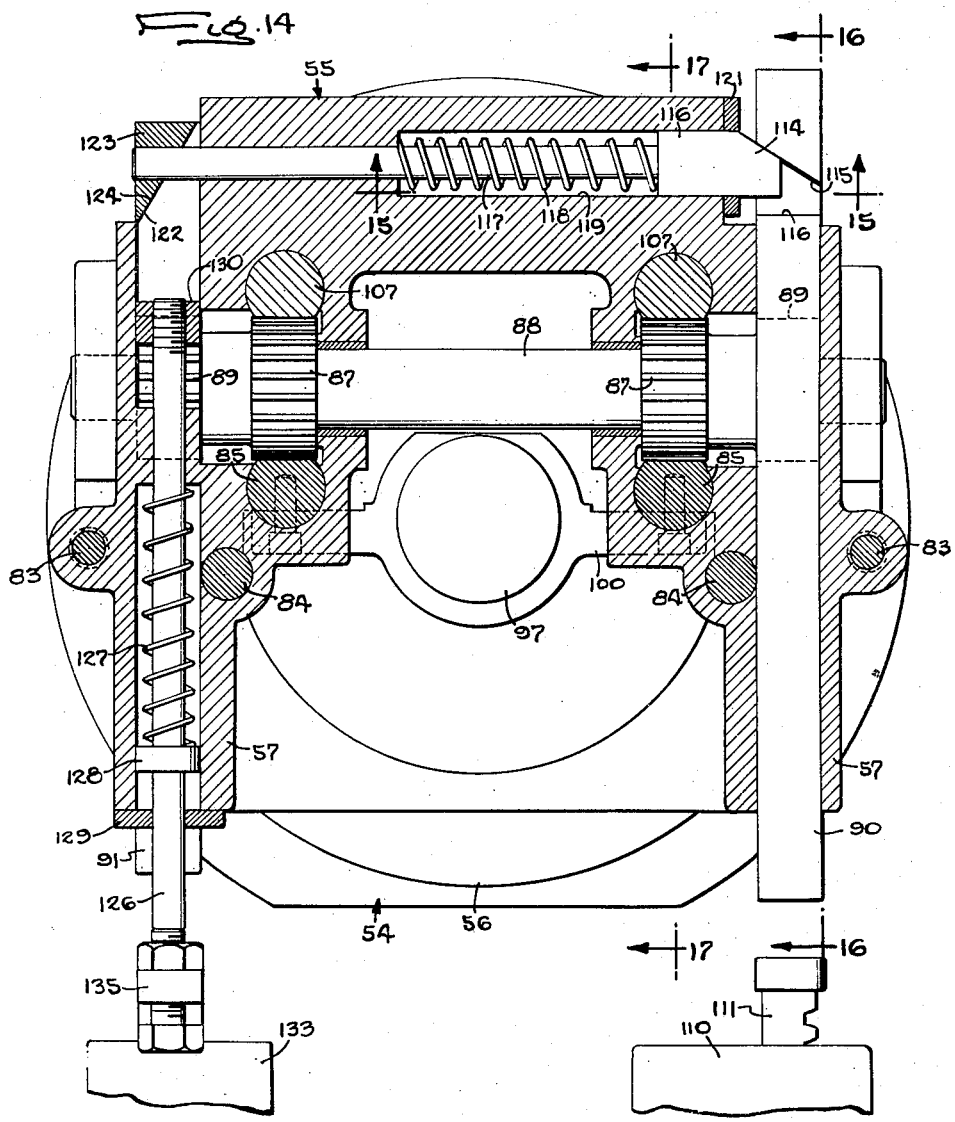
INVENTOR
Theodore C. Mann
By Carlson, Pitzner, Hubbard & Wolfe
ATTORNEYS

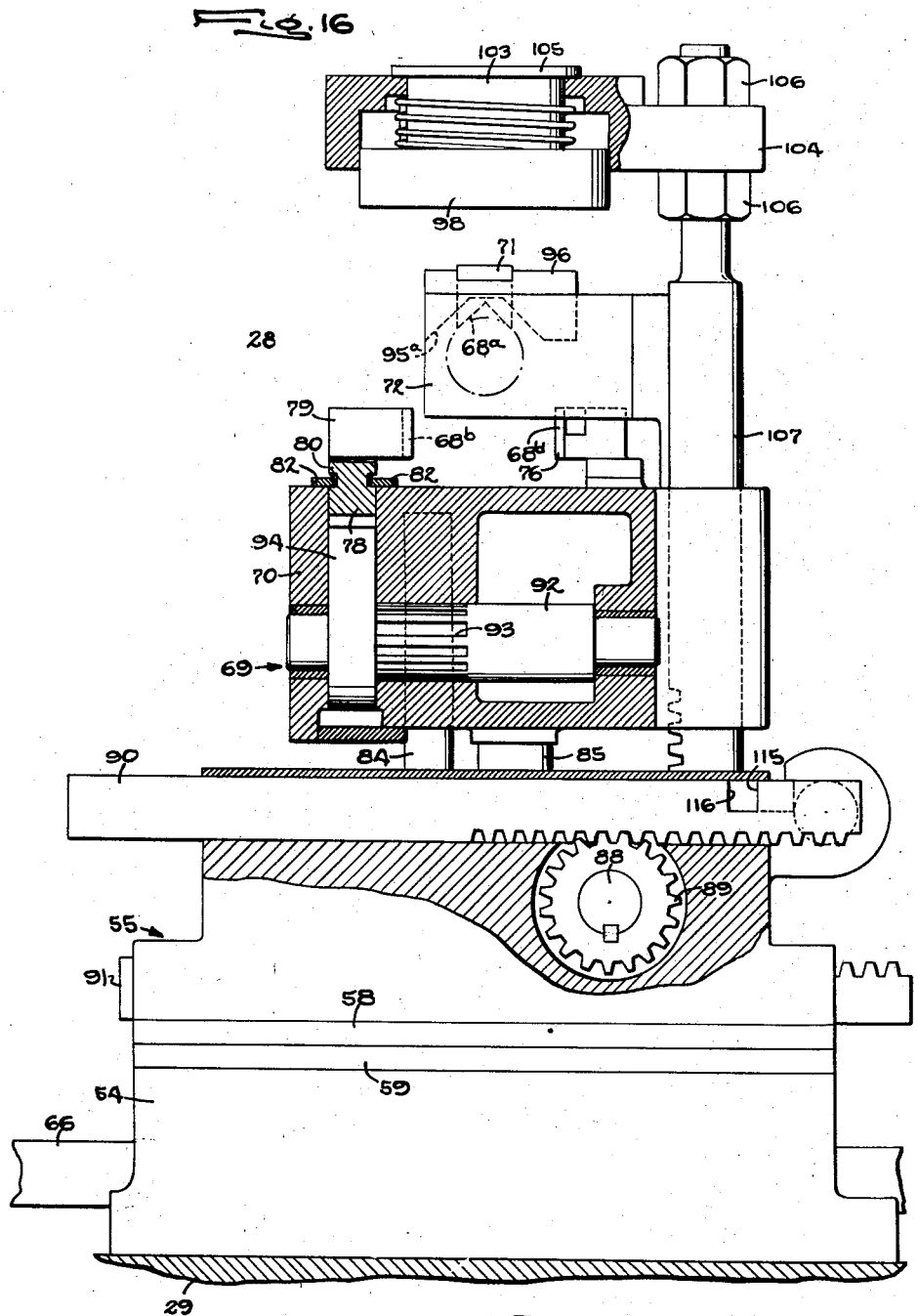

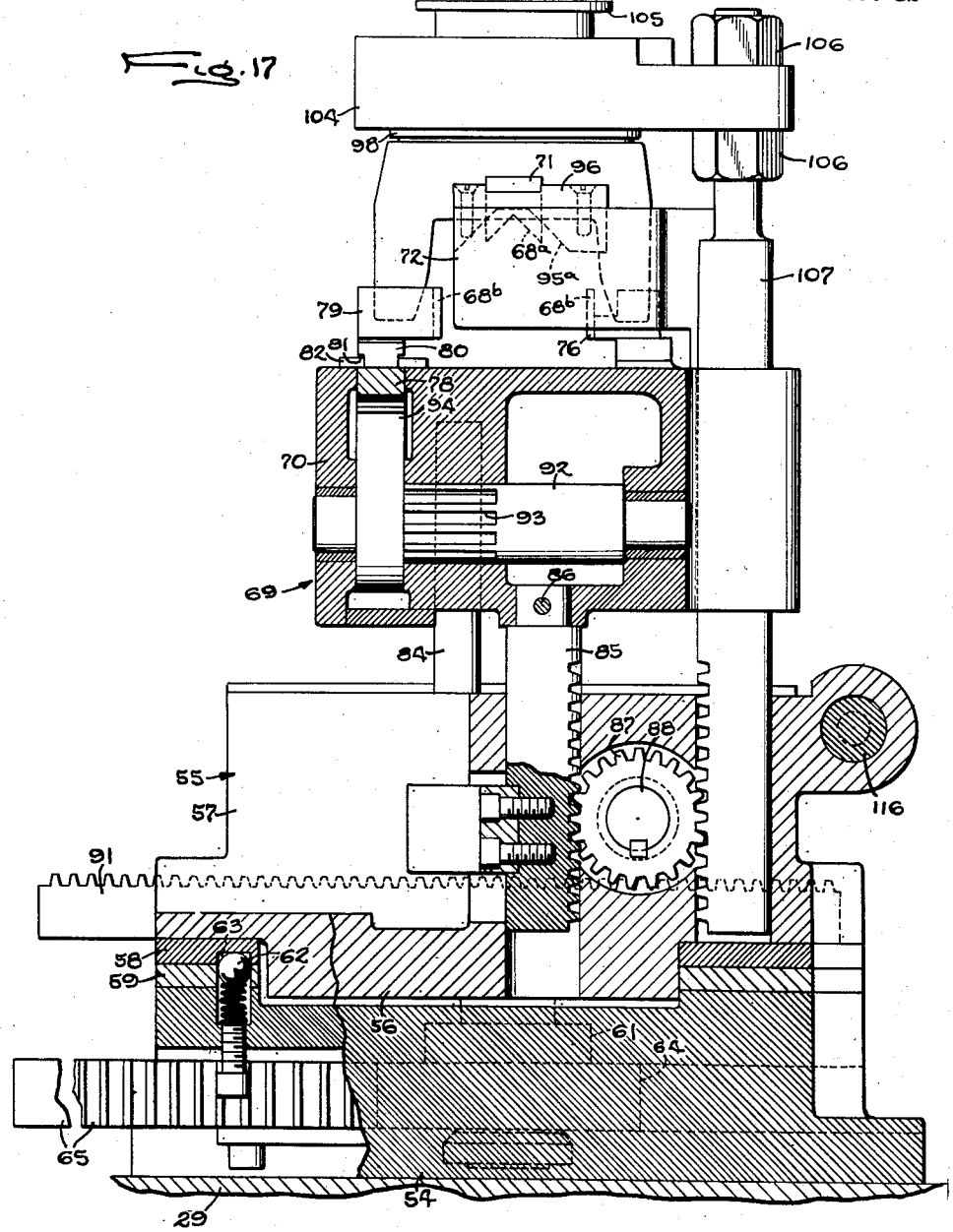

Nov. 25, 1958 T. C. MANN 2,861,328
MACHINE FOR ASSEMBLING UNIVERSAL JOINTS
Filed July 2, 1954 19 Sheets-Sheet 13
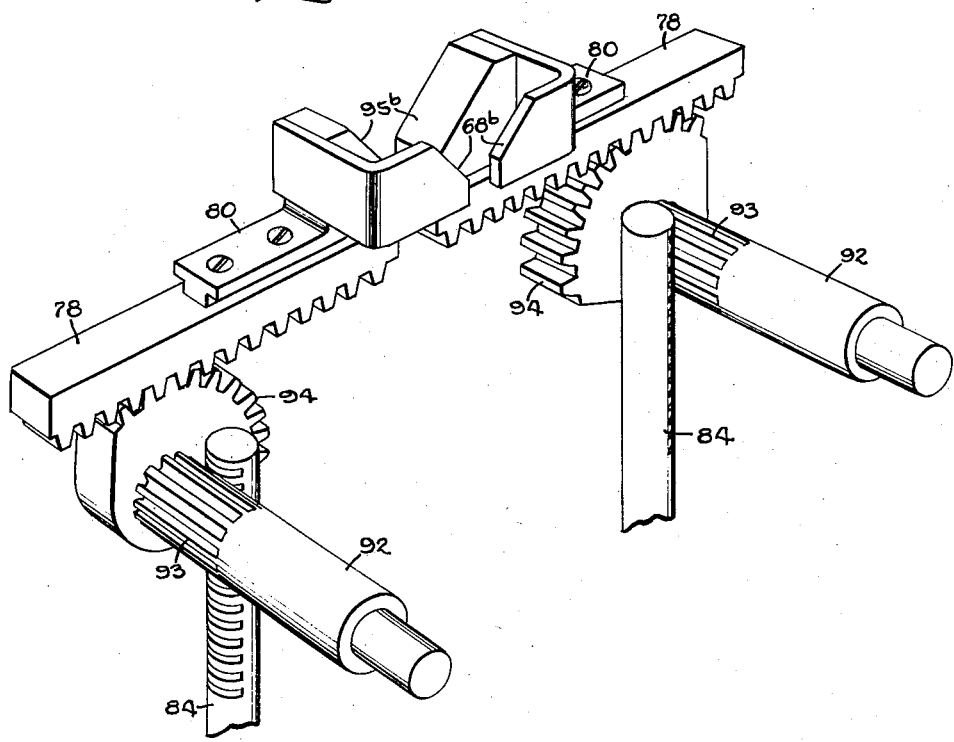
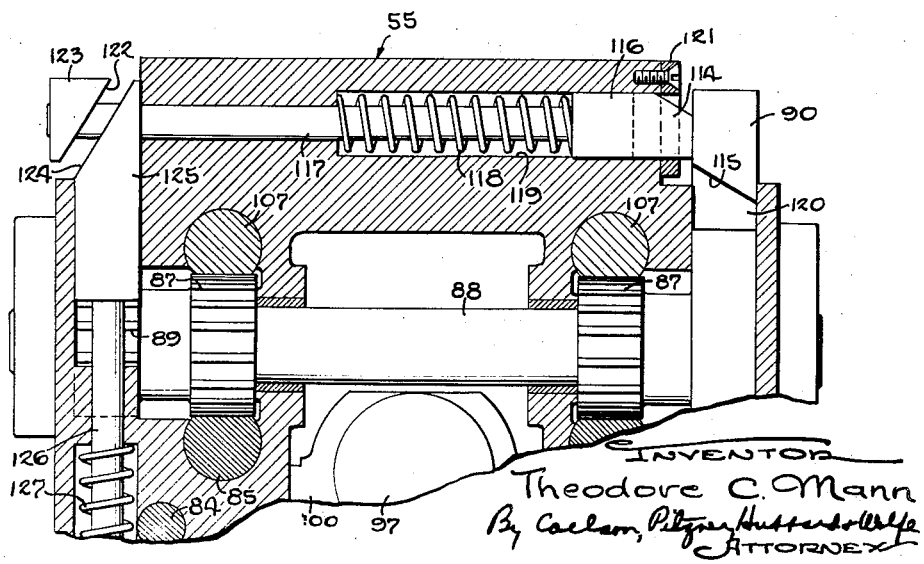

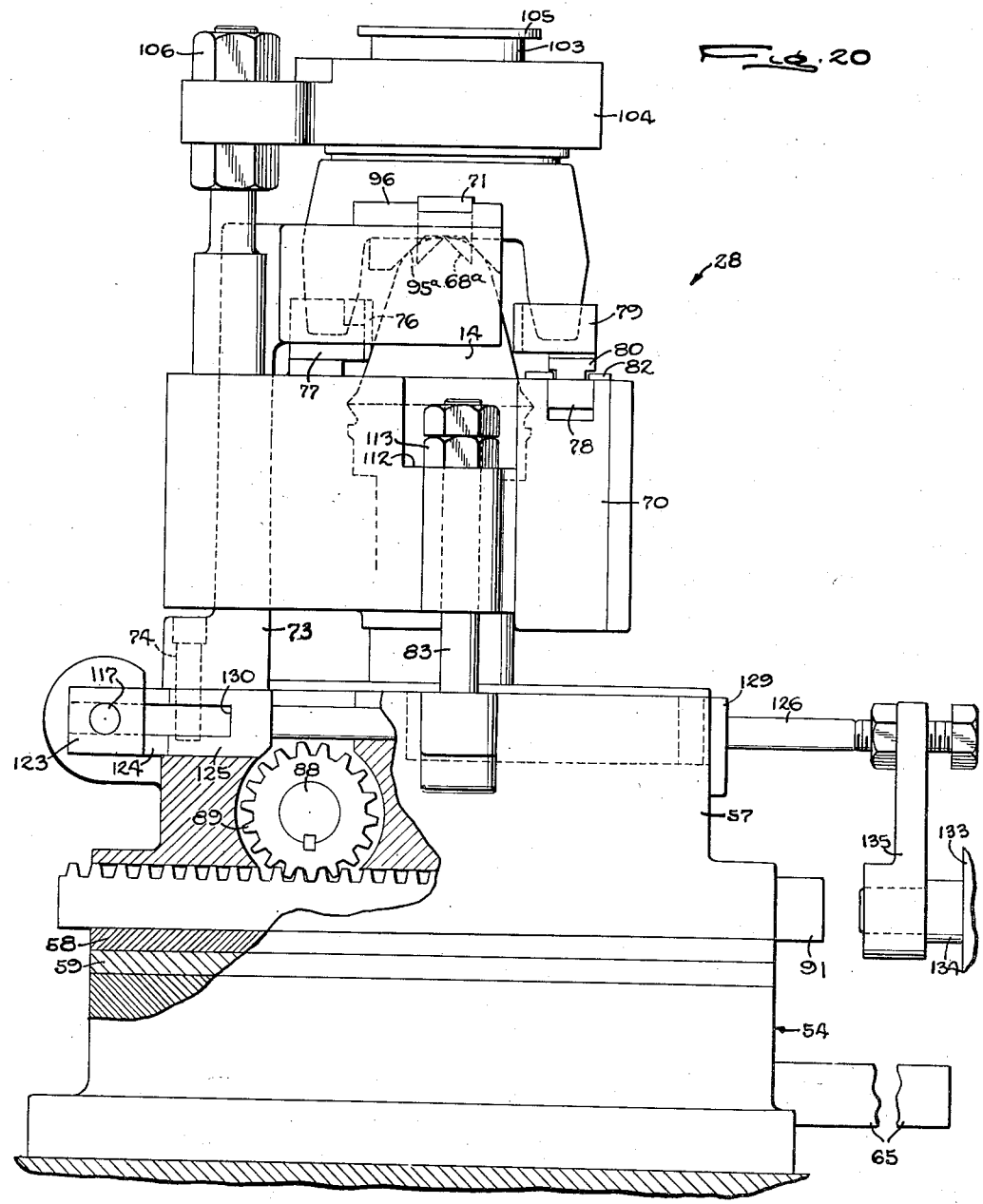

Nov. 25, 1958
T. C. MANN
2,861,328
MACHINE FOR ASSEMBLING UNIVERSAL JOINTS
Filed July 2, 1954
19 Sheets-Sheet 15
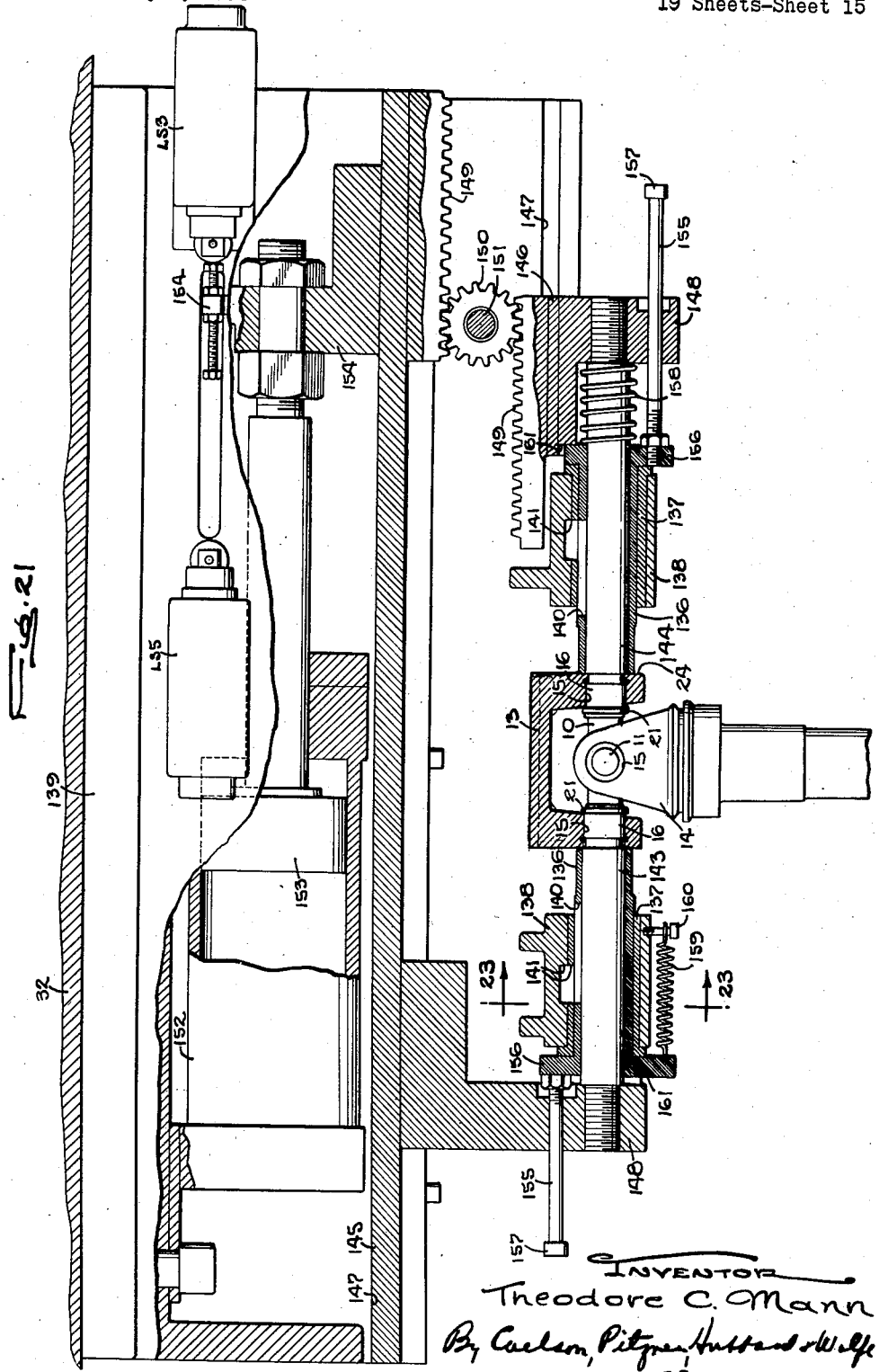

Nov. 25, 1958  T. C. MANN  2,861,328
MACHINE FOR ASSEMBLING UNIVERSAL JOINTS
Filed July 2, 1954  19 Sheets-Sheet 16
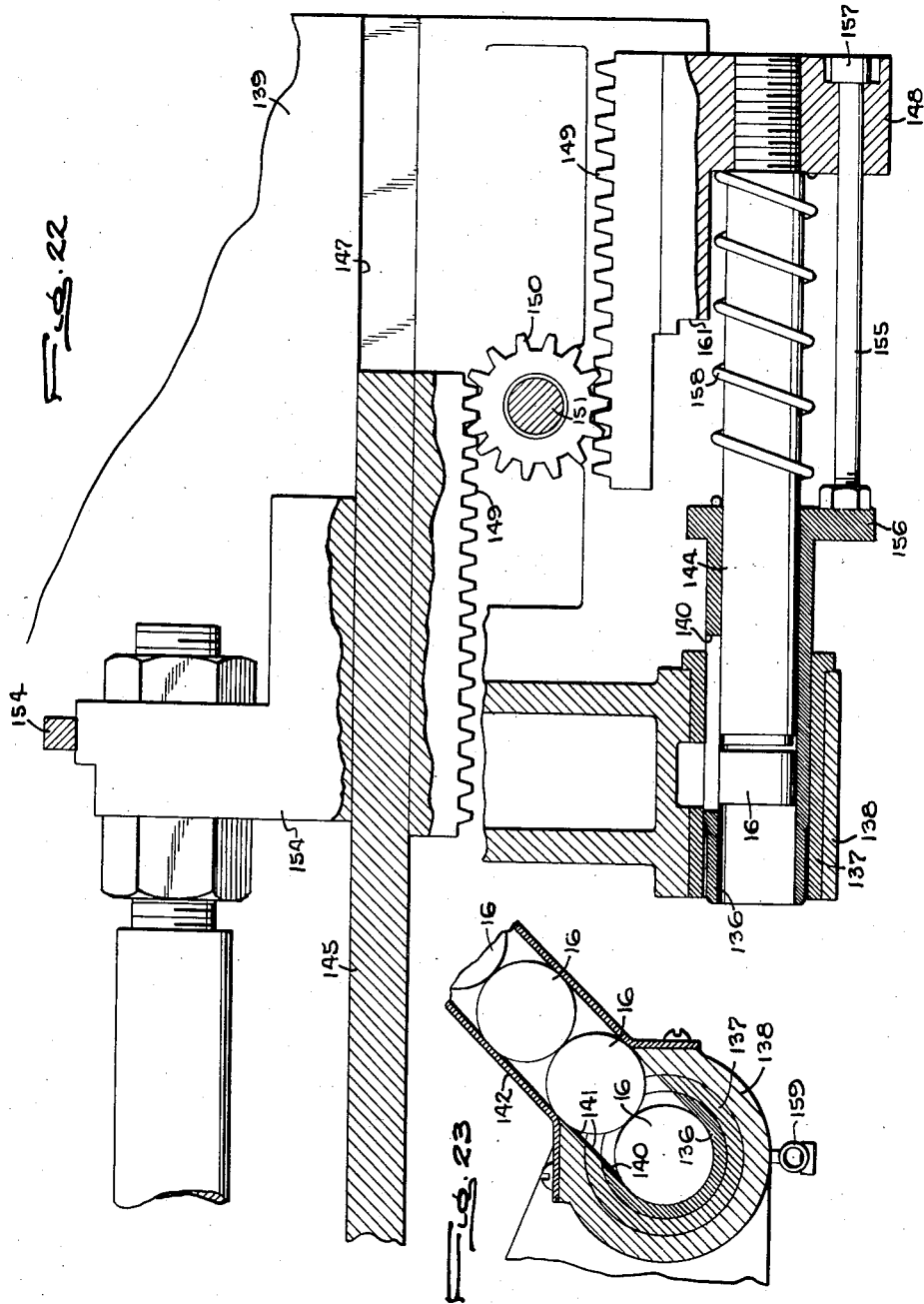
INVENTOR
Theodore C. Mann
By Carlson, Pitzner, Hubbard & Wolfe
ATTORNEY Nov. 25, 1958     T. C. MANN     2,861,328
MACHINE FOR ASSEMBLING UNIVERSAL JOINTS
Filed July 2, 1954     19 Sheets-Sheet 17
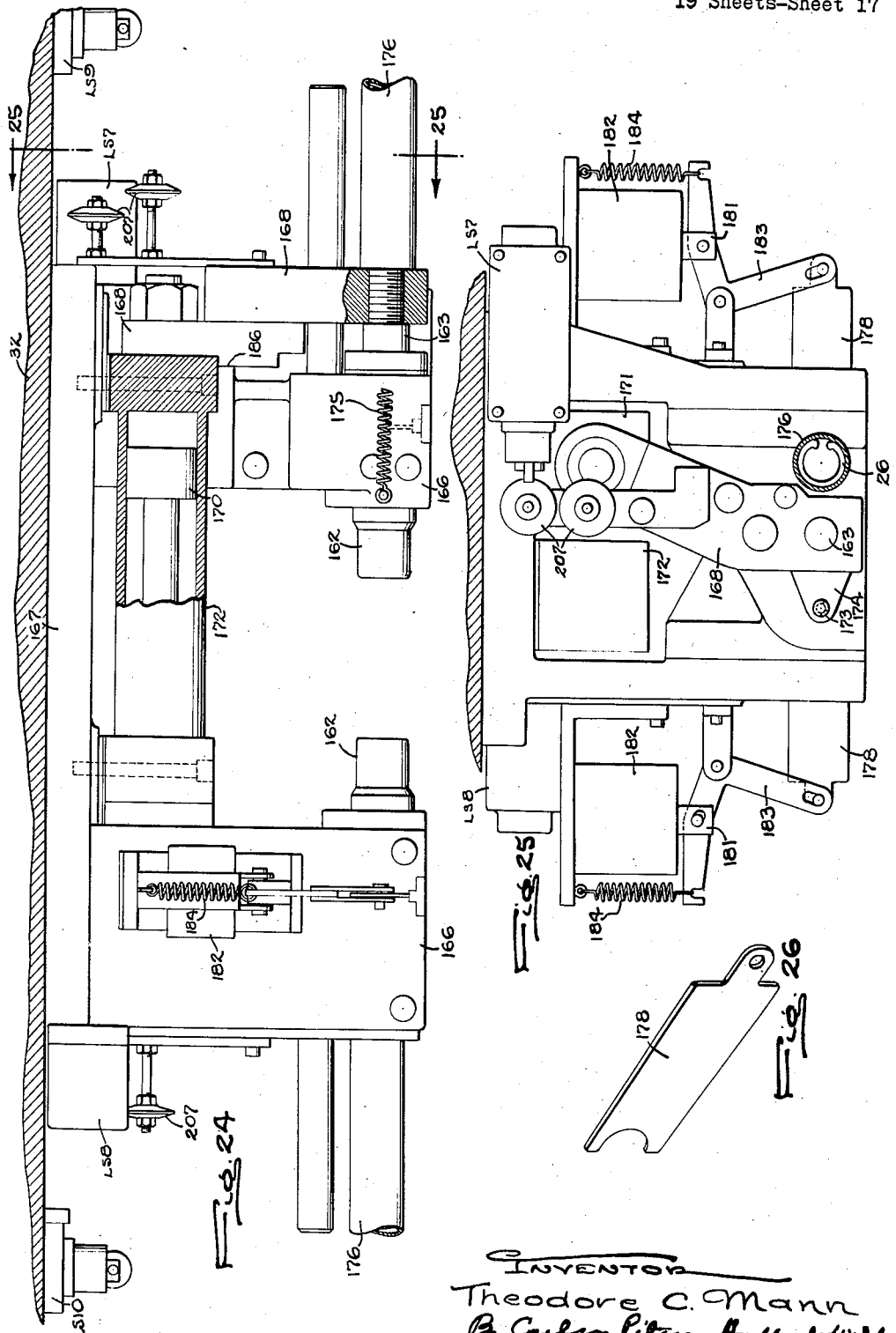
INVENTOR
Theodore C. Mann Nov. 25, 1958  T. C. MANN  2,861,328
MACHINE FOR ASSEMBLING UNIVERSAL JOINTS
Filed July 2, 1954  19 Sheets-Sheet 18
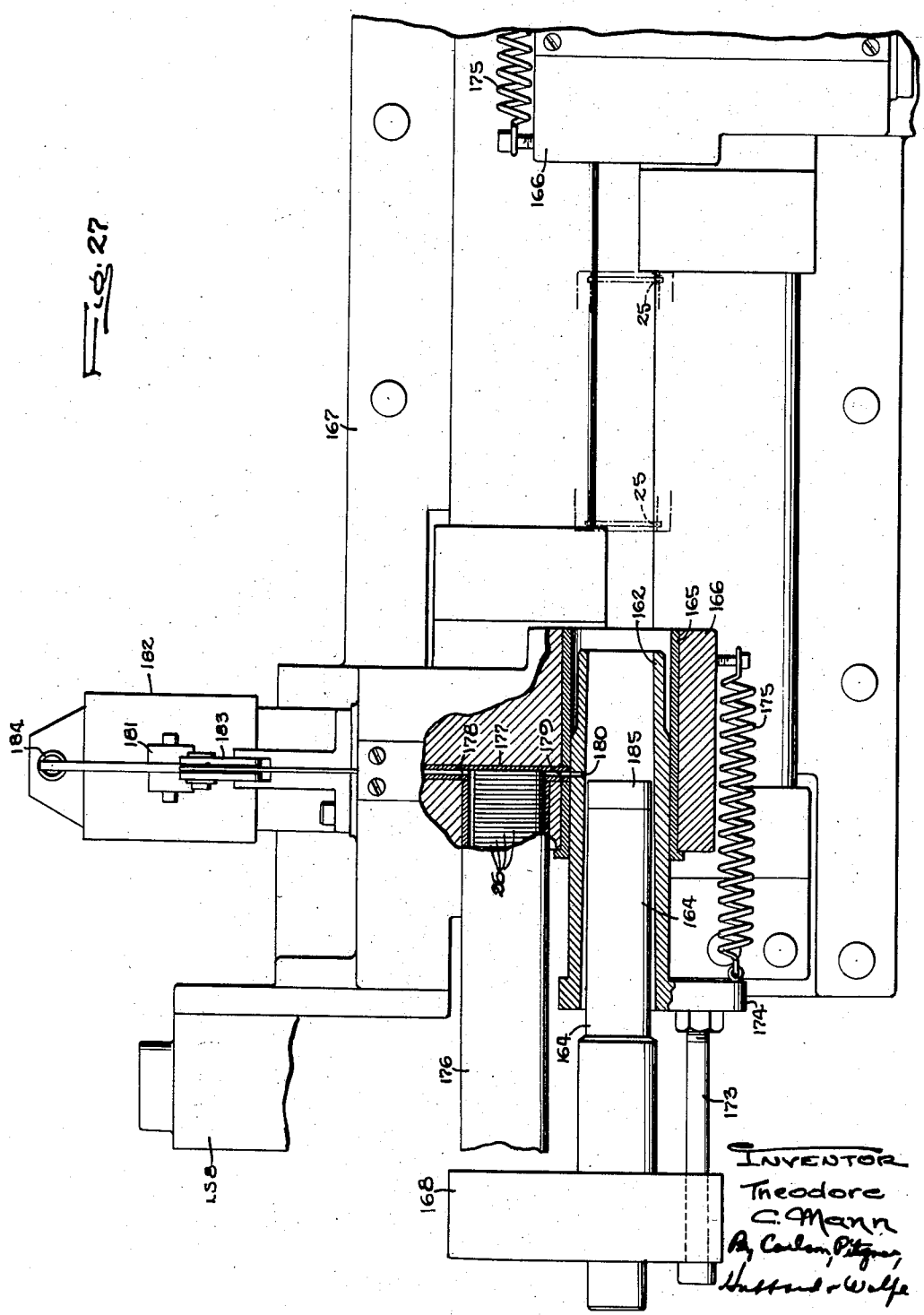

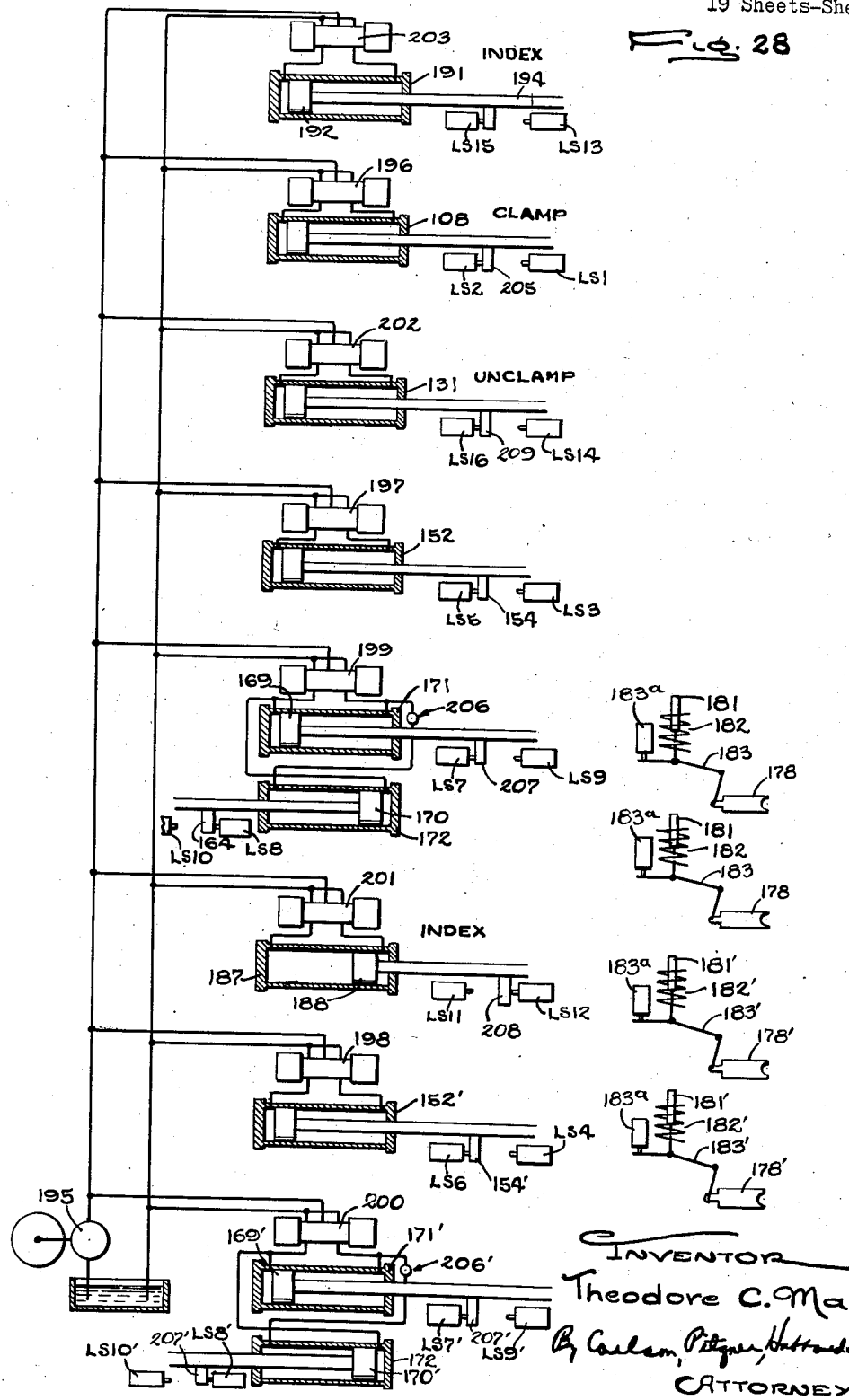

United States Patent Office 2,861,328
Patented Nov. 25, 1958

2,861,328

MACHINE FOR ASSEMBLING UNIVERSAL JOINTS

Theodore C. Mann, Beloit, Wis., assignor to Ekstrom-Carlson & Co., Rockford, Ill., a corporation of Illinois Application July 2, 1954, Serial No. 441,004

10 Claims. (Cl. 29—208)

This invention relates to universal joints of the type comprising two yokes, a four trunnion spider, and antifriction bearings pressed onto the trunnions and into the holes of the yoke arms.

Heretofore, the assembly of such joints has involved a series of hand operations including the snaking of the spider trunnions into the yoke holes to form a loosely assembled unit, holding each trunnion centered approximately in its yoke hole as the bearing is inserted from the outer end of the hole, pressing the bearing home, and finally applying and seating a snap ring in the hole.

The primary object of the present invention is to provide a machine for receiving the loose assembly and then inserting the bearings and snap rings entirely automatically to form the final joint assembly.

Another object is to hold the loose parts of a joint rigidly in their finally assembled relation with the spider trunnions centered in the respective yoke holes while the joint is presented to successive mechanisms for inserting the bearings and snap rings.

A further object is to provide novel positioning mechanism which holds the joint parts in their finally assembled relation by abutment with accurately located exterior surfaces of the parts, thereby leaving the trunnions and yoke holes free to receive the bearings.

Another object is to construct the individual positioning mechanisms of a plurality of fixtures in a novel manner for opening and closing each mechanism by actuators common to all of the fixtures.

The invention also resides in the novel construction of the various mechanisms by which the bearings and snap rings are advanced automatically onto the spider trunnions and into the yoke holes.

Other objects and advantages of the invention will become apparent from the following detailed description taken in connection with the accompanying drawings, in which Figure 1 is a side elevational view of a universal joint assembling machine embodying the present invention, the view omitting all joint supporting fixtures except the one at the loading station.

Fig. 2 is a fragmentary plan view.

Fig. 3 is a diagrammatic view illustrating the operating mechanisms at the various stations.

Fig. 4 is a fragmentary sectional view taken along the line 4—4 of Fig. 1.

Fig. 5 is a fragmentary sectional view taken along the line 5—5 of Fig. 4.

Fig. 6 is an exploded perspective view of a completely assembled joint.

Fig. 7 is a perspective view of the joint.

Fig. 8 is a plan view of a loosely assembled joint with the yoke arms shown in section in the plane of the spider trunnion axes.

Fig. 9 is a view similar to Fig. 8 showing bearings and snap rings assembled in the holes of one yoke.

Fig. 10 is a sectional view taken along the line 10—10 of Fig. 1.

Fig. 11 is a perspective view of the downwardly facing spider and yoke holders.

Fig. 12 is a perspective view of the upwardly facing spider and yoke holders.

Fig. 13 is a sectional view of a fixture taken along the line 13—13 of Fig. 2.

Fig. 14 is a sectional view taken along the line 14—14 of Fig. 13.

Fig. 15 is a fragmentary sectional view taken along the line 15—15 of Fig. 14.

Figs. 16 and 17 are sectional views taken along the lines 16—16 and 17—17 respectively of Fig. 14.

Fig. 18 is a fragmentary perspective view of part of the holder actuating mechanism.

Fig. 19 is a fragmentary view similar to Fig. 14 showing the holder latching parts in different positions.

Fig. 20 is a side elevational view of a fixture looking to the right in Fig. 13 with some of the parts broken away.

Fig. 21 is a fragmentary side elevation of the bearing inserting mechanism taken along the line 21—21 of Fig. 2 with some of the parts broken away and shown in section.

Fig. 22 is an enlarged fragmentary view similar to Fig. 21 showing the parts in different positions.

Fig. 23 is a fragmentary sectional view taken along the line 23—23 of Fig. 21.

Fig. 24 is a fragmentary side elevational view of the ring inserting mechanism taken along the line 24—24 of Fig. 2 with some of the parts broken away and shown in section.

Fig. 25 is a sectional view taken along the line 25—25 of Fig. 24.

Fig. 26 is a perspective view of a part of the ring inserting mechanism.

Fig. 27 is an enlarged fragmentary bottom view of the mechanism of Fig. 24.

Fig. 28 is a hydraulic circuit and electric switch diagram of the operating mechanisms at the various stations.

While the invention is applicable to the assembly of all universal joints of the type above referred to, it is shown in the drawings and described herein in connection with a joint commonly used in automotive vehicles. This joint (see Figs. 6 to 9) comprises a spider 10 having four right angular trunnions 11 and 12 and two yokes 13 and 14 having accurately alined holes 15 receiving antifriction bearings 16 in which the trunnions are journaled. Herein, the bearings are needle bearings of the full series cageless type each having a cup-shaped race ring 17 fitting into a yoke hole 15 and a plurality of plain rollers 18 (Figs. 6 and 9) held by grease in side by side contact around the interior of the race ring until the bearing is pressed onto a spider trunnion. Each of the trunnions 11 and 12 comprises a cylindrical surface machined on the outer end portion of an arm 19 of the spider and terminating at an oil seal which in this instance comprises a ring 20 of yieldable material seated in a metal ring 21 of L-shaped cross section pressed onto the trunnion against a shoulder. In the boring of the holes 15 in the yokes, the axes of the holes are located accurately relative to the outer arcuate end surfaces 22$^a$ and 22$^b$ of the yoke arms as by V-shaped positioning elements abutting such surfaces. Plane surfaces 23 and 24 normal to the hole axis also are machined on the inner and outer sides of each yoke arm. Spaced inwardly from the outer surface 24 of each yoke arm and extending around the interior of the yoke hole is a narrow annular groove 25 adapted to receive a snap ring 26.

In such joints, the holes 15 in the yokes 13 and 14 are large enough in relation to the size and length of the spider arms 19 to permit snaking of first one and then the other of the yoke arms onto the oppositely projecting trunnions. The spider and yokes then form a partial assembly hereafter referred to as a loosely assembled unit.

It will be observed from the foregoing that both the spider 10 and each of the yoke arms are, in the course of their individual manufacture formed with surfaces, the outer peripheries 27ª and 27ᵇ of the metal rings 21 on the spider and the outer arm ends 22ª and 22ᵇ on the yokes, which are positioned accurately relative to the bearing engaging surfaces, which are spaced substantial distances apart, and which are exposed and readily accessible both in the loosely assembled unit and in the final assembly.

In accordance with the present invention, advantage is taken of the foregoing characteristics of the joint parts and provision is made for abutting and positioning the several pairs of surfaces 22ª, 22ᵇ, 27ª and 27ᵇ of the loosely assembled yoke and spider unit first to center the trunnions 11 and 12 accurately in the holes 15 and then to retain this relation while the four bearings 16 and snap rings 26 are being presented and pressed into place.

The foregoing functions and the various steps leading to the final assembly are performed in the multiple station machine shown in the drawings by way of illustration and having fixtures 28 for receiving and holding the loosely assembled units as the latter are indexed through successive stations at which the bearings 16 and snap rings 26 are hopper fed into position and pressed onto the trunnions.

In the present machine, operating stations are spaced around a circular path and, accordingly, the fixtures are supported by and uniformly spaced around the top of a table 29 (Figs. 2 and 4) mounted on bearings 30 on a hollow bed 31 for rotation in a horizontal plane. Those of the various operating mechanisms which are not mounted around the table on the bed 31 are secured to an overhead frame plate 32 spaced above the table and the fixtures 28 and spanning posts 33 (Fig. 1) upstanding rigidly from opposite sides of the bed.

Housed within the bed 31 is mechanism which connects the table 29 and a shaft 34 driven by an electric motor 35 mounted exteriorly on the bed (Fig. 2) for indexing the table intermittently as a part of an automatic cycle. Herein, there are six fixtures 28 and six operating stations spaced uniformly around the table so that the latter is rotated through one-sixth of a revolution in each cycle.

The indexing mechanism (see Figs. 4 and 5) is a form of a Geneva motion and includes a worm wheel 36 which meshes with a worm 37 on the motor driven shaft 34 and carries a cam drum 38 having a hub 38ª mounted in bearings 39 on the bed 31 for rotation about a vertical axis located eccentrically of the table 29. Projecting rigidly from this hub along the underside of the table is a radial arm 40 which carries a cam roller 41 on its upper side. This roller normally is disposed in an inactive position adjacent the center of the table as shown in Figs. 4 and 5, but is adapted, upon rotation with the worm wheel 36, to enter the inner end of one of six downwardly opening radial slots 42 defined by blocks 43 secured to the underside of the table at uniformly spaced points. As the roller revolves with the wheel in a clockwise direction as viewed in Fig. 5 after entering a slot 42, it bears against the leading one of the blocks 43 to rotate the table in the same direction. After the table has been indexed through one-sixth of a revolution, the roller 41 leaves the slot and a tapered lock pin 44 is projected upwardly into one of six accurately located recesses 45 opening downwardly from uniformly spaced points around the table to lock the latter against movement relative to the bed.

The lock pin 44 is carried by a slide 46 which is reciprocable vertically in guides 47 on the bed 31 and carries a follower roller 48 extending into a barrel cam groove 49 formed in the periphery of the cam drum 38. This groove is shaped to lower the slide and retract the pin in the movement of the indexing roller 41 through a partial revolution from its inactive position to the adjacent slot 42, retain the pin in its retracted position while the roller is in the slot and advancing the table, and then advance the pin upwardly into a recess 45 as the roller leaves the slot. Suitable means well known in the art is provided to deenergize the motor after one revolution of the Geneva arm 40 and may include, for example, a switch 50 actuated by a dog 51 on the cam drum 38. To avoid coasting of the motor driven shaft 34, the latter may be stopped by a suitable brake (not shown) which is applied and released in response to deenergization and energization respectively of the motor. Another switch 52 is closed by a dog 53 on the cam drum 38 in response to termination of the table indexing movement to initiate operation of the mechanisms at the various operating stations to be described later.

Referring now to Figs. 10 to 20, each fixture 28 comprises generally a base 54 bolted to the top of the table 29 and a rotary frame 55 supporting the positioning elements which engage and hold the joint parts. To present the second pair of alined trunnions 12 of each joint to bearing and ring inserting mechanisms straddling the circular fixture path after the trunnions 11 of the first pair have been presented to such mechanisms, the frame is mounted on the base for rotary indexing movement relative to the latter about an upright axis.

In the present instance, the fixture frame 55 is a casting having a flat annular base portion 56 and a U-shaped portion having laterally spaced legs 57 upstanding from the base portion, the base portion carrying a flat annular ring 58 on its underside having bearing engagement with a similar ring 59 secured to the upper side of the fixture base 54. The mounting for the frame also includes a vertical shaft 60 (Fig. 13) secured at its upper end to the bottom of the frame and journaled intermediate its ends in bearing 61 on the base. To hold the frame releasably in either of two angularly spaced positions, a spring pressed detent 62 (Fig. 17) carried by the base 54 seats in two recesses 63 formed in the bottom of the frame bearing ring 58 at points spaced 90 degrees around the latter, one of the recesses being located so that the U-shaped frame portion 57 opens radially and outwardly from the table.

Indexing of the frame 55 of each fixture 28 through a quarter revolution between its two angularly spaced positions is effected herein through a spur gear 64 and rack bars 65 and 66 (Figs. 13, 16, and 20) carried respectively by the frame and the fixture base 54, the spur gear being fast on the lower end of the vertical shaft 60 (Fig. 13). The rack bars 65 and 66 are mounted to reciprocate in horizontal recesses in the underside of the base 54 and to mesh with opposite sides of the gear 64 and extend outwardly beyond the fixture base and in a general radial direction with respect to the table for movement by power actuators in a manner to be described later. When one bar 65 is pushed inwardly, the frame 55 is indexed in a clockwise direction as shown in Fig. 2 and the other bar 66 is shifted outwardly by the gear. To index the frame in the opposite direction, the other bar 66 is shifted inwardly by endwise pressure exerted on its projecting end.

The accurate locations of the exposed surfaces 27ª and 27ᵇ in relation to the trunnion axes of the spider 10 are utilized to position the latter precisely in the fixture 28 through the provision of a set of forked or V-shaped holders 68ª and 68ᵇ arranged in pairs to abut the exposed spider surfaces. One pair of holders 68ª are spaced apart laterally a distance less than the spacing between the inner surfaces 23 (Fig. 8) of each pair of yoke arms and face downwardly to abut angularly spaced points on the upper sides of the exposed surfaces 27ª of the spider trunnions 11 in the holes 15 of the lower yoke 14. Another pair of holders 68ᵇ face upwardly toward the first pair and are angularly offset from the latter 90 degrees to abut angularly spaced points on the undersides of the surfaces 27b of the trunnions 12 of the other pair. The pairs of holders are mounted on the fixture frame 55 for vertical movement relative to and toward and away from each other between spaced retracted positions (Fig. 16) to permit loading and unloading of the joints and advanced positions (Figs. 13 and 17) of abutment with the exposed spider surfaces 27a and 27b to position the spider precisely and hold the same against movement in all directions.

In the present instance, the downwardly facing holders 68a are stationarily mounted on the rotary fixture frame 55 and the upwardly facing holders 68b are carried on the upper side of a slide 69 which is reciprocable vertically on the frame to effect the relative movement between the pairs of holders. Like the rotary frame 55, the slide 69 is generally U-shaped and opens outwardly from the center of the table 29 with horizontally spaced legs 70 overlying the frame legs 57.

The stationary upper holders 68a (Fig. 11) are the forked ends of downwardly bent portions of L-shaped metal strips 71 bolted to and extending inwardly toward each other from laterally spaced legs 72 projecting horizontally and outwardly from the upper end of a vertical supporting leg 73. The latter is secured at its lower end to the top of the rotary frame by bolts 74 (Figs. 10 and 20) and extends upwardly along the inner side of the fixture 28 adjacent the center of the table 29. To provide access to the joint parts for the bearing and ring inserting mechanisms, holes 75 (Fig. 11) large enough to receive parts of such mechanisms are formed in the legs 72 and 73 in alinement with the trunnions 11 and 12 of a spider 10 clamped between the holders.

One of the lower spider holders 68b is rigid with the slide 69 and constitutes the upper forked end portion of a vertical metal plate 76 secured to a bracket 77 which is bolted to the top of the slide at the closed end thereof intermediate the slide legs 70 (Fig. 12). The other lower holder 68b is divided into two parts which are carried by two slide bars 78 mounted on the outer ends of the slide legs 70 to reciprocate transversely thereof between advanced positions in which the holder parts are located in the open end of the slide as shown in phantom in Fig. 12 and retracted positions above the slide legs as shown in full in Fig. 12 to leave the open end of the slide free for loading and unloading of joints. In this instance, each holder part is an inwardly projecting inclined end of an L-shaped metal strip 79 carried by a bracket 80 which is secured to the top of one slide bar 78 and is recessed along its bottom edges as indicated at 81. The bars slide horizontally in grooves in the tops of the slide legs 70 and plates 82 (Figs. 13, 17 and 20) secured to the legs fit into the recesses 81 to hold the bars in the grooves and guide the bars in their reciprocating movements.

Supporting the slide 69 on the frame (see Figs. 13, 14, 16, 17 and 21) are two guide bars 83 one of which is threaded at its lower end into each frame leg 57 and is slidable vertically in a bore in the adjacent slide leg 70, two fixed rack bars 84 threaded into the frame legs 57 and slidable vertically in bores in the respective slide legs 70 and two movable rack bars 85 fixed at their upper ends as by pins 86 (Fig. 17) to the undersides of the respective slide legs and reciprocable in bores in the adjacent frame legs 57. To raise and lower the slide, the movable rack bars 85 mesh with axially spaced gears 87 (Figs. 14 and 17) which are fast on a cross shaft 88 journaled in and spanning the frame legs 57. Other spur gears 89 (Figs. 16 and 20) fast on the shaft 88 mesh with holder actuating rack bars 90 and 91 which are disposed respectively above and below the cross shaft and one of which extends longitudinally of and is reciprocable horizontally in each of the frame legs 57. Both of these rack bars project horizontally beyond the ends of the respective frame legs for actuation by power operators to be described later, the upper bar 90 turning the cross shaft to raise the slide when the bar is shifted inwardly and the lower bar 91 turning the shaft to lower the slide when it is shifted inwardly.

The guide bars 78 supporting the parts 68b of the divided lower holder are connected to the slide actuating mechanism for advance of the holder parts to their closed positions as the slide 69 is raised and for retraction to their open positions as the slide is lowered to facilitate loading and unloading of joints. Such connections for the slide bars, in this instance, include shafts 92 (Figs. 13, 16, 17 and 18) journaled in and extending longitudinally of the slide legs 70 and having gear teeth 93 thereon meshing with the fixed rack bars 84. Gear segments 94 fast on the outer ends of these shafts mesh with undersides of the respective guide bars 78 so that, as the slide is raised or lowered, the segments swing inwardly or outwardly as shown in Fig. 14 to advance or retract the slide bars and the holder parts thereon.

To locate the yoke arm holes 15 in axial alinement with the respective spider trunnions 11 and 12, the arcuate end surfaces 22a and 22b of the yoke arms are urged into abutment with a second set of V-shaped holders 95a and 95b arranged in pairs to correspond with the spider holders 68a and 68b. One of the yoke holders which are somewhat larger than the spider holders is secured to and spaced outwardly from and behind each spider holder. The downwardly facing upper yoke holders 95a are formed as downwardly bent end portions of L-shaped strips 96 secured to and extending inwardly from the stationary legs 72 beneath the strips 71 of the associated spider holders 68a (Fig. 11). One of the upwardly facing yoke holders 95b is formed on the upper side of the bracket 77 supporting the plate 76 of the one piece spider holder 68b. The other upwardly facing yoke holder 95b is divided into two parts which are formed on the inner ends of the brackets 80 supporting the two part spider holder 68b on the slide bars 78.

The yoke arm end surfaces 22a and 22b are held against the respective oppositely facing pairs of yoke holders 95a and 95b by lower and upper abutments 97 and 98 (Figs. 13, 14, 16 and 17) spaced vertically from the holders to engage the remote ends of the yokes and movable relative to and toward each other in the closing movement of the holders. To permit slight shifting of each yoke axially of the holes 15 therein when the holders are closed and to facilitate loading of loosely assembled joints into the fixture, each abutment preferably is made yieldable. In the present instance, the lower abutment 97 is an annular plate having a hub 99 projecting axially from its underside and through a crosspiece 100 spanning and bolted to the movable rack bars 85 for the slide 69 so that the crosspiece and the plate move up and down with the slide. A spring 101 encircling the hub acts between the crosspiece and the plate to urge the latter upwardly, such movement being limited by a suitable stop such as a snap ring 102 seated in a groove in the hub and engaging the underside of the crosspiece.

The upper abutment 98 also is an annular plate having a hub 103 projecting upwardly through a supporting plate 104 and yieldably urged downwardly by a spring acting between the two plates. Such downward movement is limited by a plate 105 secured to the hub and engageable with the top of the support plate. To raise and lower this abutment in the opening and closing movements of the holders, the support plate 104 is clamped between nuts 106 threaded on the upper ends of two rack bars 107 which are reciprocable vertically in the slide 69 and the frame 55 and mesh with the gears 87 on the cross shaft 88.

In the open positions of the holders 68a, 68b, 95a and 95b and the abutments 97 and 98 (see Fig. 16), the separate parts of the divided lower holders 68b and 95b are retracted to positions above the tops of the slide legs 70 as shown in Fig. 12 to permit a joint to be advanced inwardly between these legs. The lower abutment 97 and the downwardly facing yoke holders 95ª are spaced apart vertically a distance slightly less than the length of the lower yoke 14 so that, in loading a loosely assembled joint, the operator shifts this abutment downwardly against the action of the spring 101 to permit the upper arm ends 22ª of the lower yoke to be inserted in the downwardly facing yoke holders 95ª. This yoke then is released to be clamped lightly between these holders and the lower abutment. The spacing of the upper abutment 98 and the upwardly facing yoke holders 95ᵇ is less than the length of the upper yoke 13 to facilitate entry of the latter between these surfaces, but these holders are close enough to the downwardly facing yoke holders 95ª to take advantage of the play between the loosely assembled joint parts and enable the ends 22ᵇ of the arms of the upper yoke 13 to rest in the lower yoke holders. Before initiating closure of the holders, the operator positions the upper yoke in this manner in the upwardly facing yoke holders with the outwardly facing surface 24 of one of the yoke arms disposed adjacent the upright upper holder support leg 73 and centers the spider trunnions 11 and 12 approximately in the respective yoke holes 15 with the trunnion surfaces 27ᵇ resting on the upwardly facing spider holders 68ᵇ.

Such loading of a loosely assembled joint into a fixture 28 and closure of the holders is performed at a loading position A, a single hydraulic actuator being utilized in this instance to close the holders of all of the fixtures as the latter are presented successively to the loading station. As shown in Figs. 1 and 2, this actuator comprises a stationary cylinder 108 mounted on the machine bed 31 and having a piston 109 therein whose rod is a rack connected through gearing 110 to a rack bar 111 which is alined with the upper clamping bar 90 on the fixture 28 when the latter is in the loading position with the U-shaped frame 55 and slide 69 thereon opening outwardly from the table as shown in Fig. 2. When pressure fluid is admitted to the head end of the cylinder 108, the actuating rack bar 111 is shifted inwardly to abut the outer end of the clamping bar 90 on the fixture and shift the latter inwardly to raise the slide 69 and lower the upper abutment 98.

Inward shifting of the clamping bar 90 and therefore the upward closing movement of the slide 69 are limited by abutment of the bottom walls 112 of recesses on the outer sides of the slide legs 70 with nuts 113 threaded onto the upper ends of the guide bars 83 of the fixture frame 55 (see Figs. 10, 13 and 20). To avoid large clamping pressures on the L-shaped seal rings 21 on the trunnions 11 and 12 of the spider 10, these stop surfaces are located accurately to position the spider holders 68ª and 68ᵇ in substantial abutment with the surfaces 27ª and 27ᵇ without applying pressure on the seal rings, the tolerance between the latter and the holders in this instance being on the order of one to one and one-half thousandths of an inch.

The use of a single power actuator to close the holders of all of the fixtures 28 is made possible by locking the holders of each fixture positively in their closed positions and retaining such locked condition during subsequent assembly operations. For this purpose, each fixture carries latch elements 114 and 115 which act between the rotary frame 55 and the clamping rack bar 90. In this instance, one element, a keeper 114, comprises a projection on the enlarged head 116 of a bolt 117 (Figs. 14, 15, 19 and 20) slidable transversely of the clamping bar and through the frame 55 on the inner side of the latter adjacent the center of the table 29 and yieldably urged toward the clamping bar 90 by a spring 118. The latter encircles the bolt in a recess 119 formed in the frame to receive the head and acts between the frame and the head. The other element, a latch 115, is the rear wall of a notch 120 formed in the upper side of the clamping bar 90 and spaced from the inner end of the latter to receive the keeper as shown in Figs. 14 and 15, after the latch has passed inwardly beyond the keeper, the interengaging surfaces of the two being inclined to insure proper locking for different positions of the bar in a limited range of movement thereof. Outward shifting of the keeper 114 under the spring force is limited by a plate 121 bolted on the frame and engaging the bolt head.

To release the latch elements 114 and 115 of each fixture 28 and permit the holders thereof to be opened, an inclined follower surface 122 on a nut 123 on the other end of the latch bolt 117 projecting beyond the frame is engaged by an inclined cam surface 124 on a nut 125 threaded onto the rear end of a release bolt 126 (Figs. 14, 19 and 20) to shift the latch bolt endwise away from the clamping bar 90. The release bolt is slidable longitudinally of one frame leg 57 above the unclamping rack bar 91 and is yieldably urged outwardly by a spring 127 acting between the frame leg and a collar 128 on the bolt, the collar engaging a stop plate 129 to limit such movement to a position in which one end of the bolt projects beyond the end of the frame leg as shown in Fig. 20. To permit movement of the cam past the latch bolt 117, the cam is slotted as indicated at 130 (Fig. 20) to receive the bolt.

While the latch elements 114 and 115 may be released and the holders moved to their open positions at a station separate from the loading station A, it is preferred to perform these functions at the latter to facilitate the loading and unloading of joints by a single operator. Herein, both the release of the latch elements 114 and 115 and inward shifting of the unclamping rack bar 91 to open the holders is effected by a single hydraulic actuator. This actuator (see Figs. 1 and 2) comprises a cylinder 131 mounted on the machine bed 31 at the loading station and having a piston 132 whose rod is a rack acting through gearing 133 to shift another rack 134 toward the table when pressure fluid is admitted to the head end of the cylinder. The other bar 134 is alined with the unclamping rack bar 91 and carries an upstanding arm 135 Figs. 1 and 14 which abuts the projecting end of the latch release bolt 126 to shift the latter inwardly to release the latch elements before the unclamping bar is engaged by the lower end of the rack bar and shifted inwardly to open the holders.

Energization of the clamping actuator 108, 109 to close the holders is performed as the first step of an automatic cycle which is initiated manually by the operator after a loosely assembled joint has been loaded into a fixture 28 at the loading station A. Energization of the unclamping actuator 131, 132 is effected as an intermediate step of this cycle as will be described later. The next step in the cycle after closure of the holding elements of the fixture at the loading station is indexing of the table 29 to present the joint to bearing inserting mechanism at the next station B located beyond the loading station along the path of advance of the fixture. When the holders are closed on the joint parts and locked, the pairs of alined spider trunnions 11 and 12 extend respectively radially of the table 29 and along the path of the fixture and the ends of the trunnions are exposed within and alined axially with the respective yoke holes 15 as shown in Fig. 8, the holes being free of obstruction and ready to receive the bearings. It is in this condition that the loosely assembled joint is presented at the first bearing inserting station B.

Bearings 16 are supported in alinement with the holes 15 of the upper yoke 13 at the station B by guide tubes 136 (Figs. 1, 3, 21 and 22) which are slidable radially of the table in bushings 137 in stationary guide cylinders 138 and back between retracted positions (see Figs. 1 and 22) spaced from the yoke on opposite sides of the fixture path and advanced positions of abutment with the outer side surfaces 24 of the yoke as shown in Fig. 21. The guide cylinders 138 are secured to the underside of an elongated support member 139 of inverted U-shaped cross section depending rigidly from the overhead frame plate 32. Bearings 16 are gravity fed one by one into the guide tubes 136 through an upwardly opening slot 140 therein and registering apertures 141 in the bushings and guide cylinders from downwardly inclined chutes 142. The latter are secured at their lower ends to the respective guide cylinders and support a series of bearings in side by side relation as shown in Fig. 23 with their open ends facing toward the fixture path, the upper ends of the chutes communicating with suitable hoppers or magazines (not shown) from which the bearings are gravity fed into the chutes.

The bearings supported by the guide tubes 136 in alinement with the yoke holes 15 are pressed into the latter by advancing plungers 143 and 144 along the tubes and into the outer ends of the holes from spaced retracted positions (see Fig. 22) beyond the lower ends of the chutes 142. Supporting the plungers for reciprocation radially of the table 29 are two slides 145 and 146 which are movable in guides 147 on the support member 139, each plunger comprising a cylindrical rod threaded at its inner end into an arm 148 depending rigidly from its associated slide. To enable the plungers to be shifted axially in unison by a single hydraulic actuator, the slides carry opposed rack bars 149 which mesh with opposite sides of a spur gear 150 fast on a shaft 151 journaled in and spanning the depending legs of the support member 139. The hydraulic actuator comprises a cylinder 152 secured to the support member 139 and a piston 153 whose rod is secured to an arm 154 upstanding from one slide 145, the plungers being advanced and retracted when pressure fluid is admitted to the head and rod ends respectively of the cylinder. In their advanced positions, the adjacent ends of the plungers are disposed equal distances from the center of the spider and are spaced apart a distance equal to the spacing of the outer sides of the grooves 25 to leave the latter exposed to receive the lock rings 26.

To utilize the motions of each of the plungers 143 and 144 to advance and retract its guide tube 136 while permitting retracting movement of the plunger relative to the tube and beyond the slot 140 therein for feeding bearings, the tube is connected to the plunger through a lost motion connection and is yieldably urged forwardly of the plunger. This connection comprises a bolt 155 threaded into a flange 156 on the outer end of each tube and extending through an aperture in the plunger arm 148 smaller than an enlarged head 157 on the outer end of the bolt. A coiled compression spring 158 encircling the outer plunger 144 and acting between the arm 148 thereof and the tube flange 156 yieldably urges the tube forwardly of the plunger. The inner tube 136 is urged forwardly of its plunger 143 by a contractile spring 159 stretched between the tube flange 156 and a lug 160 on the stationary guide cylinder 138. With these mountings for the tubes, each tube remains in abutment with the yoke surfaces 24 until its plunger arm 148 engages the bolt head 157 and then is retracted with the plunger.

In addition to supporting bearings during their advance from the chutes 142 to the yoke holes 15, the guide tubes 136 perform the function of spacing the arms of the upper yoke accurately equal distances from the center of the spider. For this purpose, the tubes with their flanges are made of equal axial lengths and inwardly facing abutments 161 on the plunger arms 148 are spaced precisely equal distances from the center of the spider and abut the tube flanges 156 when the plungers 143 and 144 move into their advanced positions in which the bearings 16 abut the seal rings 20 on the spider trunnions. When both abutments 161 engage the tube flanges 156 with the inner ends of the tubes abutting the outwardly facing surfaces 24 of the yoke arms, inward movement of the parts is stopped by such engagement and the yoke arms are centered accurately with respect to the spider, the yoke being shifted axially of the trunnions when it is off center relative to the spider before advance of the slides 145 and 146.

Movement of the slides 145 and 146 and the plungers 143 and 144 into their retracted positions is limited by abutment of the piston 153 with the head end of the cylinder 152. During such movement, the plungers move rearwardly relative to the tubes until the lost motion is taken up by engagement of the bolt heads 157 with the plunger arms 148 and then the tubes are retracted with the plungers, the lowermost bearings 16 in the chutes 142 resting on the tops of the plungers until the inner ends of the latter pass beyond the chutes. Then, one bearing drops into each guide tube in front of the plunger as shown in Figs. 22 and 23. The plungers and guide tubes remain in their retracted positions until the table has been indexed to present a new joint to be assembled to the bearing inserting mechanism. The cylinder 152 then is energized, and the guide tubes and the plungers advance together until the tubes abut opposite the sides of the upper yoke after which the plungers advance relative to and within the tubes and into abutment with the bearings to push the latter along the tubes. During such advance, the inner plunger 143 and its tube 136 pass through the hole 75 in the upright holder support leg 73. As the bearings move beyond the chute ends, the inner ends of the plungers are disposed below the chutes to block downward movement of the next bearings into the tubes. The plungers continue to push the bearings axially of the tubes and finally onto the trunnions and into engagement with the seal rings 20. In the movement of the plungers into these advanced positions, the abutments 161 engage the tube flanges 156 to center the upper yoke 13 accurately relative to the spider. Finally, the cylinder 152 is energized to retract the slides.

From the first bearing station B, each fixture 28 is indexed with the table 29 to a snap ring inserting station C at which snap rings 26 are advanced axially into the holes 15 of the upper yoke 13 and seated in the grooves 25 behind the bearings 16. The rings are supported in axial alinement with the yoke holes in guide tubes 162 on opposite sides of the fixture path and are advanced along these tubes by plungers 163 and 164 (Figs. 3, 24, 25 and 27) movable axially in and having lost motion connections with the tubes. Each tube 162 is slidable axially in a bushing 165 carried by a depending leg 166 of a mounting bracket 167 secured to the overhead frameplate 32. The plungers 163 and 164 are similar to the bearing plungers 143 and 144 and are cylindrical rods projecting inwardly through the tubes from arms 168 secured to the rods of pistons 169 and 170 of cylinders 171 and 172 on the mounting bracket. Bolts 173 secured to flanges 174 on the tubes extend through the arms 168 and constitute the lost motion connections between the tubes and the plungers. Contractile springs 175 acting between the tube flanges 174 and the adjacent bracket legs 166 yieldably urge the tubes forwardly and inwardly of the plungers.

Snap rings 26 are fed into each of the guide tubes 162 one at a time from a feed tube 176 which supports a stack of the rings in side by side relation (Fig. 27) and whose lower end portion is secured in the bracket leg 166 in parallel with the guide tube. Each feed tube extends upwardly from the bracket leg (see Fig. 1) and is secured at its upper end to a suitable hopper or magazine (not shown) which is mounted on the overhead frame plate 32 and from which the rings are gravity fed along the tube. At its lower end, the feed tube terminates short of a vertical bracket leg wall 177 (Fig. 27) along which a recessed plate 178 is advanced to pick up the end ring of the stack and shift the same radially through registering slots 179 and 180 in the bushing 165 and the guide tube 162 when the latter is retracted. The plate 178 is slidable horizontally in the bracket leg 166 and is connected to the armature 181 of a solenoid 182 through a bell crank 183 fulcrumed on the bracket leg for shifting the plate inwardly past the feed tube and through the guide tube slot 180 when the solenoid is energized, a spring 184 acting between the bell crank and the solenoid to retract the armature and the plate 178 when the solenoid is deenergized.

To enable the snap rings 26 to be fed into the guide tubes 162 in expanded condition and still be advanced axially through the yoke holes 15, each guide tube is tapered axially and inwardly to contract each ring automatically as an incident to its axial advance by the plunger and into the yoke hole. Thus, the diameter of each guide tube adjacent the laterally opening slot 180 thereof is equal approximately to the expanded diameter of a snap ring and, at the inner end of the tube which abuts the yoke surface 24, is substantially equal to the diameter of the yoke hole. To maintain each ring in a radial plane of the guide tube during its axial advance along the latter, the inner end of each plunger carries a suitable permanent magnet 185 which holds the ring after its deposit in the guide tube by the reciprocating feed plate 178 and until the ring registers with and expands radially into the groove 25 in the yoke arm.

Separate hydraulic actuators are provided for the respective ring inserting plungers 163 and 164 to enable the latter to be advanced successively for proper seating of the snap rings 26 in the yoke arm grooves 25. First, the inner plunger 163 is advanced to a position which is determined by abutment of the plunger arm 168 with a stop 186 on the bracket leg 166. In this position, the inner end of the plunger defined by the permanent magnet 185 is flush with the outer edge of the groove 25 so that the ring carried by the plunger registers with and expands outwardly into the groove. Such advance of the ring usually is accompanied by inward shifting of the adjacent bearing 16 relative to the spider trunnion and past the groove as permitted by compression of the seal ring 20.

After the inner snap ring 26 is seated in its groove 25 and while the inner plunger is in its advanced position, the outer plunger 164 advances to carry the ring thereon into registry with its groove. Inward movement of this plunger is limited by abutment of the ring with the bearing 16 after the latter is shifted along the trunnion and inwardly past the groove to compress the adjacent seal ring 20.

Each fixture 28 advances from the first ring inserting station to a second bearing inserting station E and then to a second ring inserting station F where assembly of the joint is completed by the insertion of bearings 16 and snap rings 26 into the holes 15 of the lower yoke 14 and onto the associated trunnions 11. The inserting mechanisms at these stations are identical with and operate in the same manner as those at the first inserting stations B and C. The parts at the second stations E and F which correspond to those at the first stations B and C are indicated by similar but primed reference characters (Figs. 1 and 3).

To present the holes 15 of the lower yoke 14 in alinement with the bearing plungers 143' and 144' and ring plungers 163' and 164' radially of the table 29 at the second inserting stations E and F, the fixture frame 55 is indexed through a quarter revolution about its vertical axis after the fixture leaves the first ring inserting station C and before it reaches the second bearing station E. In the present instance, such indexing is performed by a hydraulic actuator located at a station D at a dwell position of the fixture 28 between the stations C and E. The actuator comprises a cylinder 187 (Fig. 2) mounted on the machine bed 31 and having a piston 188 whose rod is a rack bar which acts through gearing 189 to advance an indexing bar 190 inwardly when pressure fluid is admitted to the rod end of the cylinder. The bar 190 is positioned to abut and shift inwardly the projecting end of the rack bar 65 by which the fixture frame is rotated clockwise as viewed in Fig. 2 to a position in which the U-shaped fixture frame 55 opens forwardly along the fixture path, the frame being held releasably in this position by seating of the detent 62 in its recess 63.

After the assembly of the joint is completed by the insertion of snap rings 26 at the second ring station F, the fixture advances to the loading and unloading station A where the fixture frame 55 is indexed back to the position in which it opens outwardly from the table 29 and the unclamping actuator 131 is energized to move the holders to their open positions and release the joint. Such reverse indexing is effected by a hydraulic actuator comprising a cylinder 191 mounted on the bed 31 and having a piston 192 whose rod is a rack bar. This bar acts through gearing 193 to advance another rack bar 194 (Fig. 1) inwardly into abutment with the outer projecting end of the reverse index bar 66 and shifts the latter inwardly of the fixture base 54 to return the fixture frame 55 to its original position when pressure fluid is admitted to the head end of the cylinder.

The extent of the motions produced by the various hydraulic actuators described above may be positively limited by engagement of the pistons with the ends of the respective cylinders or by the provision of stops coacting with the movable parts. All of the actuators are supplied with pressure fluid from one or more sources 195 (Fig. 28) which are controlled by so-called four way valves 196, 197, 198, 199, 200, 201, 202 and 203 whose movable members are shifted back and forth between end positions by selective energization of two associated solenoids. When one solenoid is energized, the valve member is shifted to admit pressure fluid to one end of an associated hydraulic cylinder while connecting the other cylinder end to a drain line. When the other valve solenoid is energized, the valve reverses the connections between the cylinder ends and the drain and supply lines.

To cause the movable parts at the different stations to operate in the proper sequence and thereby execute a desired automatic cycle during which the fixtures with loosely assembled joints clamped therein are advanced one step with the table 29 and the mechanism at each station operates on the fixture or the joint at the station, the solenoid valves are arranged to be controlled by various limit switches shown in Fig. 28. These switches control the various energizing circuits through conductors which have been omitted for purposes of simplifying the disclosure and because the manner of interconnection of such switches and solenoids and the interlocking of the circuits to insure the desired sequence is well understood in the art.

*Operation*

Assuming that all of the various power actuators are in their retracted or idle positions as shown in the circuit diagram (Fig. 28), the cycle of operation proceeds as follows after pressure fluid is available. Let it further be assumed that the parts of joints being assembled are clamped rigidly in each of the fixtures 28 at the stations B, C, D, E and F and have previously been operated on at these stations and that the fixture at the loading station A is empty with the holders in their retracted positions.

When the operator has positioned a loosely assembled joint between the holders of the fixture 28 at the station A with the lower yoke 14 clamped between the lower abutment 97 and the downwardly facing holders 95ª and the arms of the upper yoke 13 resting in the upwardly facing holders 95ᵇ, the cycle may be started by closing two push button switches 204 (Fig. 1). As a result, a circuit conditioned by closure of various other switches when the parts are positioned as shown is completed to energize a solenoid of the valve 196 for admitting fluid to the head end of the clamping cylinder 108, whereby to advance the clamping rack bar 90 relative to the fixture frame 55 and raise the slide 69 to close the holders. During this movement, the abutments 97 and 98 are shifted toward each other and the parts of the upwardly facing spider and yoke holders 68b and 95b are shifted upwardly and inwardly across the open end of the frame to close on the exposed surfaces 27a and 27b of the spider and the ends 22a and 22b of the yoke arms and thereby aline the spider trunnions 11 and 12 axially with the respective yoke holes 15. Such closing movement of the holders is terminated by abutment of the stops 113 on the frame with the slide surfaces 112, the keeper 114 having entered the notch 116 in the clamping bar 90 to lock the holders positively in their closed positions. In the final closing movement of the holders, an arm 205 on the clamping piston rod (Figs. 1 and 28) closes a switch LS1 which completes circuits for energizing the other solenoid of the valve 196 to reverse the latter so as to direct fluid to the cylinder 108 for retracting the clamp actuating bar 111.

Closure of the push button switches 204 also completes circuits for energizing the solenoids 182 and 182' for the pusher plates 178 and 178' and advancing the latter to feed a snap ring into each of the guide tubes 162 and 162', the release of the push buttons deenergizing the solenoids for the spring return of the pusher plates. In the return of the pusher plates, switches 183a are closed by the bell cranks 183 and 183'.

In response to the combined closure of all of the switches 183a (Fig. 28) and a switch LS2 by the arm 205 in the return movement of the clamp actuating bar 111, the table indexing motor 35 is energized for swinging the Geneva arm 40 through one sixth of a revolution to index the table 29 through one sixth of a revolution and present each fixture 28 to the next succeeding station. As this indexing movement is completed, the switch 50 is actuated by the dog 51 on the cam drum 38 to deenergize the motor 35 and energize the brake thereof and the switch 52 is closed by the dog 53 to initiate the movements of the inserting and indexing mechanisms at the stations B, C, D, E and F.

Closure of the switch 52 results in energization of a solenoid of each of the valves 197 and 198 to admit pressure fluid to the head ends of the cylinders 152 and 152' to advance the bearing plungers 143, 144, 143' and 144' to shift bearings 16 along the respective guide tubes and press the same into the yoke holes 15 and onto the spider trunnions alined radially of the table 29 at the stations B and E. Such movements are terminated by engagement between the abutments 161 and 161' on the plunger arms and the flanges 156 and 156' on the outer ends of the bearing guide tubes 136 and 136' which, at their inner ends, abut the outer sides 24 of the yoke arms to center the respective yokes relative to the spiders. At the same time, the arms 154 and 154' on the piston rods of the cylinders 152 and 152' actuate switches LS3 and LS4 to energize the other solenoid of the valves 197 and 198 to reverse the latter for directing fluid to these cylinders to retract the bearing plungers.

At the end of such retracting movements of the bearing plungers, the arms 154 and 154' actuate switches LS5 and LS6. The latter are connected in series in a circuit which includes the push button switches 204 and is conditioned for initiation of a new cycle by movement of all of the parts to their original positions. Thus, the machine is disabled should any of the parts, for example the piston 153 for the bearing plungers 143 and 144 at the station B, fail to return to its starting position.

When the switch 52 is closed upon completion of the table indexing movement, a circuit also is completed thereby for energizing one solenoid of the valve 199 to direct pressure fluid to the rod ends of the cylinders 171 and 172 for advancing the ring inserting plungers 163 and 164 at the station C, the inner plunger 163 advancing ahead of the outer plunger 164 due to a restriction 206 in the line to the outer plunger cylinder (see Fig. 28). Advance of the inner plunger is terminated by abutment of the arm 168 thereof with the stop 186 on the bracket leg 166, an actuator 207 on the arm closing a switch LS7 in the advanced position of the plunger. The outer plunger 164 then reaches its advanced position and a switch LS8 is closed to complete a circuit through the inner plunger switch LS7 to the other solenoid of the valve 199 for reversing the latter and retracting the plungers together. In the final retracting movements of the plungers, switches LS9 and LS10 in the series conditioning circuit including the push button switches 204 are closed by actuators on the respective plunger arms 168.

The operation of the ring inserting mechanism at the station F in response to closure of the table switch 52 is identical with that of the ring inserting mechanism just described, the cylinders 171' and 172' for these plungers being controlled by the valve 200. Switches LS7' and LS8' are closed in the final advancing movements of the plungers to reverse the valve 200 and switches LS9' and LS10' in the series conditioning circuit are closed in the final retracting movements of the plungers by actuators 207' on the respective plunger arms.

Closure of the table responsive switch 52 completes a circuit to one solenoid of the valve 201 for the indexing cylinder 187 at the index station D to admit pressure fluid to the rod end thereof for advancing the rack bar 65 (Fig. 2) and rotating the fixture frame 55 through a quarter revolution. An arm 208 on the rod of the piston 188 actuates a switch LS11 to energize the other solenoid of the valve and reverse the latter to retract the rack bar. Another switch LS12 in the series conditioning circuit is closed by the arm 208 when the bar reaches its retracted position.

At the loading station A, pressure fluid is admitted to the head end of the indexing cylinder 191 to advance the rack bar 66 and return the fixture frame 55 to its original position in response to energization of one solenoid of the valve 203 by closure of the switch 52 at the termination of the table indexing movement. In the final advance of this bar, a switch LS13 is actuated to energize one solenoid of the valve 203 for the unclamping cylinder 131 and the unclamping rack bar 134 advances first to unlock the latch elements 114 and 115 and then separate the holders by lowering the slide 69. An arm 209 on the unclamping piston rod actuates a switch LS14 in the advanced position of the unclamping bar to complete circuits to the other solenoids of the valves 202 and 203 for retracting both the unclamping bar 134 and the indexing bar 194, switches LS15 and LS16 in the series conditioning circuit being closed when these bars are completely retracted.

After the holders are opened at the loading station A and while the remainder of the partially executed cycle is completed, the operator may remove the completely assembled joint therefrom and insert another loosely assembled joint. Then, as soon as all of the parts have returned to their original positions and all of the conditioning switches have been closed thereby, a new cycle may be initiated by closure of the push button switches 204.

I claim as my invention:

1. A machine for inserting bearings onto the spider trunnions of a loosely assembled spider and double yoke unit, said machine having, in combination, a plurality of fixtures each having a body and holders mounted thereon for movement back and forth and into and out of advanced positions in which the holders abut pairs of exposed surfaces on said unit to center all of the trunnions thereof in the respective holes of the yokes, means for supporting said fixtures in spaced relation and advancing the same step by step along a predetermined path and through a plurality of stations, means at one of said stations for shifting the holders of the fixture into said advanced positions and thereby bringing the trunnions and yokes into final centered positions, latch elements acting between said body and said holders to hold the latter in said advanced positions thereof and mounted on the fixture for turning with the latter relative to said path while maintaining the holders in their advanced positions, means at two of said stations for presenting bearings to two of the alined trunnions and pressing the same into the yoke holes and onto the trunnions, means operable after the insertion of one pair of bearings to turn the fixture relative to said path while said holders are held in said advanced positions by said latch elements, and mechanism operable automatically in response to the movement of each fixture to a final one of said stations to release said latch elements for movement of the holders out of said advanced positions.

2. In a machine for completing the assembly of a loosely assembled spider and double yoke unit, the combination of, a pair of alined plungers movable axially toward and away from each other and back and forth between advanced positions spaced apart a distance corresponding to the desired spacing of parts on alined trunnions of said unit and retracted positions spaced farther apart, a fixture adapted to support said unit between said plungers with the spider centered between said advanced plunger positions and with the holes of one yoke and the associated trunnions alined axially with the plungers, two guide tubes one telescoping closely with and movable axially relative to each of said plungers and yieldably urged axially relative to its plunger and forwardly thereof toward said fixture between the plungers, means acting between each of said tubes and its plunger to limit movement of the tube forwardly relative to the plunger to a position spaced from the unit in said fixture when the plunger is in said retracted position thereof, means for inserting an annular part into each of said tubes ahead of said plunger therein when the latter is retracted, means for advancing said plungers first to move said tubes forwardly into abutment with opposite sides of said one yoke and then to advance the annular parts along the tubes and from the latter into said alined yoke holes, and axially facing abutments on said tubes and said plungers located accurately to engage each other in the final movement of the plungers into said advanced position and acting through the tubes to shift the yoke and center the same axially with respect to said alined trunnions.

3. In a machine for completing the assembly of a loosely assembled spider and double yoke unit, the combination of, a fixture adapted to support said unit with the spider trunnions alined axially with the respective yoke holes while leaving the trunnions and the holes free to receive bearings and lock rings, a pair of plungers alined axially with the holes of one yoke in said unit and movable axially toward each other from retracted positions and into spaced advanced positions within the respective yoke holes, a guide tube telescoping with and movable axially relative to each of said plungers and yieldably urged ahead of the plunger to a limit position short of the unit when the plunger is retracted, means for inserting a lock ring into each of said tubes ahead of the plunger therein when the latter is retracted, means for advancing said plungers first to move said tubes forwardly into engagement with opposite sides of said one yoke and then to advance each ring along the tube and into a yoke hole, and a stop limiting the advancing movement of a first one of said plungers to a position of registry with the outer side of an annular internal recess of said one yoke, said advancing means including a device retarding the advance of the second one of said plungers until said first plunger has reached said advanced position therof.

4. In a machine for completing the assembly of a partially assembled spider and double yoke unit, the combination of, a plurality of fixtures each having holders mounted thereon for movement into and out of advanced position in which the holders abut pairs of exposed surfaces on said unit to center all of the trunnions in the respective holes of the yokes, means for supporting said fixtures in spaced relation and advancing the same step by step through a plurality of stations, an actuator at one of said stations common to all of said fixtures and operable to shift the holders of each of said fixtures into said advanced positions when the fixture is presented to the station, latch elements on each of said fixtures engaging each other in the final movement of the holders thereof against said exposed surfaces to lock the holders in said advanced positions, mechanism at subsequent stations for pressing bearings into the yoke holes and onto the spider trunnions of units clamped in said fixtures, and a member at a final one of said stations common to all of said fixtures and operable to release said latch elements to permit shifting of said holders of each successive fixture away from said advanced positions when the fixture is presented to the station.

5. In a machine for completing the assembly of a partially assembled spider and double yoke unit, the combination of, a fixture body, a plurality of jaws arranged in two opposed sets to engage pairs of exposed surfaces on opposite sides of said unit and hold all of the spider trunnions centered in the respective holes of the yokes, means on said body supporting said sets of jaws for relative advancing and retracting movement into and out of closed positions of gripping engagement with said exposed surfaces, a member connected to the movable ones of said jaws and mounted on said body to move back and forth in the advancing and retracting movements of said jaws, latch elements carried by said body and said member and engaging each other as an incident to the final closing movement of said jaws to hold the latter positively in said closed positions, and means for releasing said latch elements to permit retraction of said jaws.

6. In a machine for completing the assembly of a partially assembled spider and double yoke unit, the combination of, a set of four forked abutments opening in the same direction and arranged in two pairs to engage exposed surfaces on one yoke and the associated alined spider trunnions and aline the latter and the yoke holes axially, the abutments of each of said pairs respectively engaging one spider trunnion and the outer end of the associated yoke arm, a second similar set of four forked abutments spaced from and facing toward said first set and angularly offset therefrom to engage exposed surfaces on the other yoke and the other two alined spider trunnions and center the latter in the yoke holes, means mounting said sets for relative movement toward and away from each other and into and out of holding engagement with said exposed surfaces, each abutment of one of said pairs comprising two parts movable relative to each other transversely of the direction of relative movement of said sets and back and forth between spaced retracted positions in which the unit may be moved between the parts and advanced positions of holding engagement with said exposed surfaces, and means responsive to movement of said sets and operable to advance and retract said abutment parts respectively during the movement of said sets toward and away from each other.

7. In a machine for completing the assembly of a partially assembled spider and double yoke unit, the combination of, a set of four forked abutments opening in the same direction and arranged in two pairs to engage exposed surfaces on one yoke and the associated alined spider trunnions and aline the latter and the yoke holes axially, the abutments of each of said pairs respectively engaging one spider trunnion and the outer end of the associated yoke arm, a second similar set of four forked abutments spaced from and facing toward said first set and angularly offset therefrom to engage exposed surfaces on the other yoke and the other two alined spider trunnions and center the latter in the yoke holes, and means mounting said sets for relative movement toward and away from each other and into and out of holding engagement with said exposed surfaces, each abutment of one of said pairs comprising two parts movable relative to each other transversely of the direction of relative movement of said sets and back and forth between spaced retracted positions in which the unit may be moved between the parts and advanced positions of holding engagement with said exposed surfaces.

8. In a machine for completing the assembly of a universal joint having two yokes and a spider with aligned trunnions inserted loosely in alined bores of the yoke arms, the combination of, a first set of four V-shaped holders facing in the same direction and arranged in an inner pair engageable with exposed surfaces on two alined spider trunnions and an outer pair straddling said inner pair and engageable with the exposed ends of the arms of the yoke associated with the trunnions to aline the holes of the yoke arms and the trunnions axially, a second set of similar V-shaped holders spaced from and facing toward the holders of said first set and angularly offset therefrom to engage exposed surfaces on the other two alined trunnions and the ends of the arms of the other yoke, two opposed yieldable abutments one spaced from and facing toward each of said sets of holders and acting against the associated yoke to urge the yoke arms into abutment with the outer pair of holders of the set, and means supporting said sets of holders and said abutments for relative movement of the latter toward each other and of the sets of holders toward each other and into abutment with said yoke surfaces and arm ends.

9. In a machine for completing the assembly of a universal joint having two yokes and a spider with alined trunnions inserted loosely in alined bores of the yoke arms, the combination of, a first set of four V-shaped holders facing in the same direction and arranged in an inner pair engageable with exposed surfaces on two alined spider trunnions and an outer pair straddling said inner pair and engageable with the exposed ends of the arms of the yoke associated with the trunnions to aline the holes of the yoke arms and the trunnions axially, a second set of similar V-shaped holders spaced from and facing toward the clamps of said first set and angularly offset therefrom to engage exposed surfaces on the other two alined trunnions and the ends of the arms of the other yoke, two opposed abutments one spaced from and facing toward each of said sets of holders and acting against the associated yoke to urge the yoke arms into abutment with the outer pair of holders of the set, and means supporting said sets of holders and said abutments for relative movement of the latter toward each other and of the sets of holders toward each other and into abutment with said yoke surfaces and arm ends.

10. In a machine for completing the assembly of a universal joint having a yoke and a spider with alined trunnions inserted loosely in alined bores of the yoke arms, the combination of, rigid abutment surfaces engageable with exposed surfaces on one side of said spider, a first pair of V-shaped abutments facing toward said surfaces and spaced apart to engage a pair of exposed surfaces on alined trunnions on the other side of the spider, means supporting said abutments for movement relative to and toward said abutment surfaces and into holding engagement with said trunnion surfaces, a second pair of V-shaped abutments secured to and straddling said first pair and opening in the same direction to engage the outer exposed ends of the adjacent yoke arms to aline the bores thereof axially with the spider trunnions therein, and a yieldable abutment opposing and spaced from said pairs of V-shaped abutments to engage the yoke and urge the arms thereof into abutment with said second pair of abutments.

References Cited in the file of this patent

UNITED STATES PATENTS

| | | |
|---|---|---|
| 821,946 | Marshall | May 29, 1906 |
| 1,574,631 | Mirfield | Feb. 23, 1926 |
| 1,905,094 | Hirvonen | Apr. 25, 1933 |
| 2,169,063 | Wensley et al. | Aug. 8, 1939 |
| 2,222,605 | Carlson | Nov. 26, 1940 |
| 2,312,914 | Koszeghy | Mar. 2, 1943 |
| 2,390,596 | Larsen | Dec. 11, 1945 |
| 2,578,124 | Birkebak | Dec. 11, 1951 |

FOREIGN PATENTS

| | | |
|---|---|---|
| 667,935 | Great Britain | Mar. 12, 1952 |